US012642743B2

(12) United States Patent
Kriheli et al.

(10) Patent No.: US 12,642,743 B2
(45) Date of Patent: *Jun. 2, 2026

(54) SEPTUM HOLDERS FOR USE IN SYRINGE CONNECTORS

(71) Applicant: EQUASHIELD MEDICAL LTD., Tefen Industrial Park (IL)

(72) Inventors: Marino Kriheli, Tel-Aviv (IL); Raanan Tavor, Yuvalim (IL)

(73) Assignee: EQUASHIELD MEDICAL LTD., Tefen Industrial Park (IL)

( * ) Notice: Subject to any disclaimer, the term of this patent is extended or adjusted under 35 U.S.C. 154(b) by 215 days.

This patent is subject to a terminal disclaimer.

(21) Appl. No.: 18/356,341

(22) Filed: Jul. 21, 2023

(65) Prior Publication Data

US 2023/0355473 A1 Nov. 9, 2023

Related U.S. Application Data

(60) Continuation of application No. 16/983,567, filed on Aug. 3, 2020, now Pat. No. 11,759,394, which is a division of application No. 15/552,016, filed as application No. PCT/IL2016/050280 on Mar. 14, 2016, now Pat. No. 10,765,601.

(30) Foreign Application Priority Data

Mar. 16, 2015 (IL) ......................................... 237788

(51) Int. Cl.
*A61J 1/14* (2023.01)
*A61J 1/20* (2006.01)

(52) U.S. Cl.
CPC ............. *A61J 1/1406* (2013.01); *A61J 1/201* (2015.05); *A61J 1/2013* (2015.05); *A61J 1/2096* (2013.01); *A61J 1/2055* (2015.05)

(58) Field of Classification Search
CPC ........ A61J 1/1406; A61J 1/201; A61J 1/2013; A61J 1/2055
See application file for complete search history.

(56) References Cited

U.S. PATENT DOCUMENTS

| | | | | |
|---|---|---|---|---|
| 9,597,260 B2 * | 3/2017 | Ivosevic | ............... | A61J 1/2082 |
| 2010/0218846 A1 * | 9/2010 | Kriheli | .................. | A61J 1/2096 141/5 |
| 2023/0285242 A1 * | 9/2023 | Shem-Tov | .............. | B65B 3/003 |

FOREIGN PATENT DOCUMENTS

| | | | |
|---|---|---|---|
| EP | 3067037 B1 * | 10/2017 | ............ A61J 1/2055 |
| WO | WO-2018186361 A1 * | 10/2018 | ............ A61J 1/2096 |

OTHER PUBLICATIONS

Internet search for “needle valve” (Year: 2025).*

* cited by examiner

*Primary Examiner* — Susan S Su
(74) *Attorney, Agent, or Firm* — Whitestone Law, PLLC

(57) ABSTRACT

Some embodiments relate to a septum holder comprising a body, a septum attached to the body, and an insert comprising at least one bore configured to form a seat of a needle valve. The insert can be held in place between at least a portion of the septum and at least a portion of the body.

8 Claims, 18 Drawing Sheets

PRIOR ART

PRIOR ART

PRIOR ART

SEPTUM HOLDERS FOR USE IN SYRINGE CONNECTORS

CROSS REFERENCE TO RELATED APPLICATIONS

This application is a continuation of U.S. application Ser. No. 16/983,567 filed Aug. 3, 2020, which is a division of U.S. application Ser. No. 15/552,016 filed on Aug. 18, 2017, which is a national stage entry of PCT Patent Application No. PCT/IL2016/050280, filed on Mar. 14, 2016, which claims the priority benefit under 35 U.S.C. § 119 of Foreign Application No.: IL23778815A filed Mar. 16, 2015, the contents of each of which are hereby incorporated by reference in their entireties.

FIELD OF THE INVENTION

The present invention relates to the field of fluid transfer devices. Particularly, the invention relates to apparatus for the contamination-free transfer of a hazardous drug from one container to another. More particularly, the invention relates to improvements in the syringe connectors that are used in fluid transfer apparatuses.

BACKGROUND OF THE INVENTION

Advances in medical treatment and improved procedures constantly increase the need for improved valves and connectors. The demands relating to variety of types, quality, needle safety, microbial ingress prevention and leak prevention are constantly growing. Additionally, advances in sampling or dose dispensing technologies, automated and manual, aseptic or non aseptic applications, call for new safe concealing solutions for the sampling needle. One extremely demanding application exists in the field where medical and pharmacological personnel that are involved in the preparation and administration of hazardous drugs risk being exposed to hazardous drugs and to their vapors, which may escape to the surroundings. As referred to herein, a "hazardous drug" is any injectable material the contact with which, or with the vapors of which, may constitute a health hazard. Illustrative and non-limitative examples of such drugs include, inter alia, cytotoxins, antiviral drugs, chemotherapy drugs, antibiotics, and radiopharmaceuticals, such as herceptin, cisplatinum, fluorouracil, leucovorin, paclitaxel, etoposide, cyclophosphamideand neosar, or a combination thereof, in a liquid, solid, or gaseous state.

Hazardous drugs in liquid or powder form are contained within vials, and are typically prepared in a separate room by pharmacists provided with protective clothing, a mouth mask, and a laminar flow safety cabinet. A syringe provided with a cannula, i.e. a hollow needle, is used for transferring the drug from a vial. After being prepared, the hazardous drug is typically added to a solution contained in a bag which is intended for parenteral administration, such as a saline solution intended for intravenous administration.

Since hazardous drugs are toxic, direct bodily contact thereto, or exposure to even micro-quantities of the drug vapors, considerably increases the risk of developing medical conditions such as skin cancer, leukemia, liver damage, malformation, miscarriage and premature birth. Such exposure can take place when a drug containing receptacle, such as a vial, bottle, syringe, and intravenous bag, is subjected to overpressure, resulting in the leakage of fluid or air contaminated by the hazardous drug to the surroundings. Exposure to a hazardous drug also results from a drug solution remaining on a needle tip, on a vial or intravenous bag seal, or by the accidental puncturing of the skin by the needle tip. Additionally, through the same routes of exposure, microbial contaminants from the environment can be transferred into the drug and fluids; thus eliminating the sterility with possibly fatal consequences.

U.S. Pat. Nos. 8,196,614 and 8,267,127 to the inventor of the present invention describe closed system liquid transfer devices designed to provide contamination-free transfer of hazardous drugs. FIG. 1 and FIGS. 3*a* to 3*b* are schematic cross-sectional views of the apparatus 10 for transferring hazardous drugs without contaminating the surroundings, according to one embodiment of the invention described in U.S. Pat. No. 8,196,614. The main features of this apparatus that are relevant to the present invention will be described herein. Additional details can be found in the aforementioned patent.

The proximal section of apparatus 10 is a syringe 12, which is adapted to draw or inject a desired volume of a hazardous drug from a fluid transfer component, e.g. a vial 16 or an intravenous (IV) bag in which it is contained and to subsequently transfer the drug to another fluid transfer component. At the distal end of syringe 12 is connected a connector section 14, which is in turn connected to vial 16 by means of vial adaptor 15.

Syringe 12 of apparatus 10 is comprised of a cylindrical body 18 having a tubular throat 20 that has a considerably smaller diameter than body 18, an annular rubber gasket or stopper assembly 22 fitted on the proximal end of cylindrical body 18, hollow piston rod 24 which sealingly passes through stopper 22, and proximal piston rod cap 26 by which a user can push and pull piston rod 24 up and down through stopper 22. A piston 28 made of an elastomeric material is securely attached to the distal end of piston rod 24. Cylindrical body 18 is made of a rigid material, e.g. plastic.

Piston 28, which sealingly engages the inner wall of, and is displaceable with respect to, cylindrical body 18 defines two chambers of variable volume: a distal liquid chamber 30 between the distal face of piston 28 and connector section 14 and a proximal air chamber 32 between the proximal face of piston 28 and stopper 22.

Connector section 14 is connected to the throat 20 of syringe 12 by means of a collar which proximally protrudes from the top of connector section 14 and surrounds throat 20. Note that embodiments of the apparatus do not necessarily have a throat 20. In these embodiments syringe 12 and connector section 14 are formed together as a single element at the time of manufacture, or permanently attached together, e.g. by means of glue or welding, or formed with a coupling means, such as threaded engagement or a Luer connector. The connector section 14 comprises a double membrane seal actuator which is moveable in a reciprocating manner from a normal, first configuration in which the needles are concealed when the double membrane seal actuator is disposed in a first, distal position and a second position in which the needles are exposed when the double membrane seal actuator is proximally displaced. Connector section 14 is adapted to be releasably coupled to another fluid transfer component, which can be any fluid container with a standard connector such as a drug vial, intravenous bag, or an intravenous line to produce a "fluid transfer assembly", through which a fluid is transferred from one fluid transfer component to another.

Connector section 14 comprises a cylindrical, hollow outer body; a distal shoulder portion, which radially protrudes from the body and terminates at the distal end with an opening through which the proximal end of a fluid transfer component is inserted for coupling; a double membrane seal actuator 34, which is reciprocally displaceable within the interior of the body; and one or more resilient arms 35 serving as locking elements, which are connected at a proximal end thereof to an intermediate portion of a cylindrical actuator casing that contains double membrane seal actuator 34. Two hollow needles that function as air conduit 38 and liquid conduit 40 are fixedly retained in needle holder 36, which protrudes into the interior of connector section 14 from a central portion of the top of connector section 14.

Conduits 38 and 40 distally extend from needle holder 36, piercing the upper membrane of actuator 34. The distal ends of conduits 38 and 40 have sharp pointed ends and apertures through which air and liquid can pass into and out of the interiors of the conduits respectively as required during a fluid transfer operation. The proximal end of air conduit 38 extends within the interior of proximal air chamber 32 in syringe 12. In the embodiment shown in FIG. 1, air conduit 38 passes through piston 28 and extends inside of hollow piston rod 24. Air flowing through conduit 38 enters/exits the interior of piston rod 24 and exits/enters to air chamber 32 through an aperture formed at the distal end of piston rod 24 just above piston 28. The proximal end of liquid conduit 40 terminates at the top of or slightly proximally from the top of needle holder 36, so that the liquid conduit will be in fluid communication with the distal liquid chamber 30 via the interior of throat 20 of syringe 12.

Double membrane seal actuator 34 comprises a cylindrical casing that holds a proximal disc shaped membrane **34*a* having a rectangular cross-section and a two level distal membrane 34*b* having a T-shaped cross-section with disc shaped proximal portion and a disc shaped distal portion disposed radially inwards with respect to the proximal portion. The distal portion of the distal membrane 34*b* protrudes distally from actuator 34. Two or more equal length resilient elongated arms 35 are attached to the distal end of the casing of actuator 34. The arms terminate with distal enlarged elements. When actuator 34 is in a first position, the pointed ends of conduits 38 and 40 are retained between the proximal and distal membranes, isolating the ends of conduits 30 and 40 from the surroundings, thereby preventing contamination of the interior of syringe 12** and leakage of a harmful drug contained within its interior to the surroundings.

Vial adaptor 15 is an intermediate connection that is used to connect connector section 14 to a drug vial 16 or any other component having a suitably shaped and dimensioned port. Vial adaptor 15 comprises a disk shaped central piece to which a plurality of circumferential segments, formed with a convex lip on the inner face thereof for facilitating securement to a head portion of a vial 16, are attached at the circumference of the disk and pointing distally away from it and a longitudinal extension projecting proximally from the other side of the disk shaped central piece. Longitudinal extension fits into the opening at the distal end of connector section 14 to allow transfer of the drug as described herein below. The longitudinal extension terminates proximally with a membrane enclosure having a diameter larger than that of the extension. A central opening in the membrane enclosure retains and makes accessible a membrane **15*a***.

Two longitudinal channels, which are internally formed within the longitudinal extension and that extend distally from the membrane in the membrane enclosure, are adapted to receive conduits 38 and 40, respectively. A mechanical guidance mechanism is provided to insure that the conduits 38 and 40 will always enter their designated channel within the longitudinal extension when connector section 14 is mated with vial adaptor 15. The longitudinal extension terminates distally with a spike element **15*b*** which protrudes distally. The spike element is formed with openings in communication with the internally formed channels, respectively and openings at its distal pointed end.

Vial 16 has an enlarged circular head portion attached to the main body of the vial with a neck portion. In the center of the head portion is a proximal seal **16*a*, which is adapted to prevent the outward leakage of a drug contained therein. When the head portion of vial 16 is inserted into the collar portion of vial adaptor 15 and a distal force is applied to vial adaptor 15, the spike element 15*b* of the connector section 14 pierces the seal 16*a* of vial 16, to allow the internal channels in the connector section 14 to communicate with the interior of drug vial 16. When this occurs, the circumferential segments at the distal end of the collar portion of the connector section are securely engaged with the head portion of vial 16. After the seal of vial 16 is pierced it seals around the spike preventing the outward leakage of the drug from the vial. At the same time the tops of the internal channels in vial adaptor 15 are sealed by the membrane 15*a* at the top of vial adaptor 15, preventing air or drug from entering or exiting the interior of vial 16**.

The procedure for assembling drug transfer apparatus 10 is carried out as shown in FIGS. **2*a* to 2*d*: Step 1—After the vial 16 and vial adaptor 15 have been joined together, with spike element 15*b* penetrating proximal seal 16*a* of the vial, the membrane enclosure 15*a* of vial adaptor 15 is positioned close to the distal opening of connector section 14, as shown in FIG. 2*a*. Step 2—A double membrane engagement procedure is initiated by distally displacing the body of connector section 14 with an axial motion until the membrane enclosure and longitudinal extension of vial adaptor 15 enters the opening at the distal end of the connector section 14, as shown in FIG. 2*b*. Step 3—the distal membrane 34*b* of actuator 34 is caused to contact and be pressed against the stationary membrane 15*a* of vial adaptor 15 by additional distal displacement of the body of the connector section 14. After the membranes are pressed tightly together the enlarged elements at the ends of the arms of the connector section 14 are squeezed into the more narrow proximal section of connector section 14 thereby holding the membranes pressed together and engaged around the longitudinal extension and under the membrane enclosure of vial adaptor 15, as shown in FIG. 2*c*, thereby preventing disengagement of the double membrane seal actuator 34 from vial adaptor 15. Step 4—Additional distal displacement of the body of connector section 14, as shown in FIG. 2*d*, causes actuator 34 to move proximally relative to the body of the connector section 15 until the tips of conduits 38 and 40 pierce the distal membrane of actuator 34 and the membrane at the top of vial adaptor 15 and are in fluid communication with the interior of vial 16. These four steps are performed by one continuous axial motion as connector section 14 is distally displaced relative to the vial adaptor 15, and they will be reversed to separate connector section 14 from vial adaptor 15 by pulling connector section 14 and vial adaptor 15** apart. It is important to emphasize that the procedure is described herein as comprising four separate steps, however this is for ease in describing the procedure only. It is to be realized that in actual practice the secured double membrane engagement (and disengagement) procedure using the present invention is carried out using a single smooth axial movement.

After drug transfer assembly 10 shown in FIG. 1 is assembled as described hereinabove with reference to FIGS. **2*a* to 2*d*, the piston rod 24 can be moved to withdraw liquid from vial 16** or to inject liquid from the syringe into the vial.

The transfer of liquid between the distal liquid chamber 30 in the syringe 12 and liquid 48 in the vial 16 and transfer of air between the proximal air chamber 32 in the syringe 12 and air 46 in the vial 16 takes place by an internal pressure equalization process in which the same volumes of air and liquid are exchanged by moving through separate channels symbolically shown in FIG. 1 by paths 42 and 44 respectively. This is a closed system which eliminates the possibility of exchange of air or liquid drops or vapor between the interior of assembly 10 and the surroundings.

FIG. 3*a* schematically shows injection of a liquid into a vial. To inject liquid contained in the liquid chamber 30 of syringe 12 into the vial 16 the drug transfer assembly 10 must be held vertically with the vial at the bottom in an upright position as shown in FIG. 3*a*. Pushing piston 28 distally pushes the liquid out of liquid chamber 30 through conduit 40 into vial 16. Simultaneously, as the volume of liquid chamber 30 is reduced by the distally moving piston, the volume of air chamber 32 is increased. This creates a temporary state of negative pressure in the air chamber and therefore air (or an inert gas) inside vial 16 will be sucked through conduit 38 into air chamber 32. Additionally and simultaneously, as the liquid is added to the vial, the volume available for the air in the vial is reduced creating a temporary state of positive pressure, therefore the air is forced from the vial 16 through conduit 38 into air chamber 32, thus equalizing the pressures in the transfer assembly 10 and equilibrium is reached when piston 28 stops moving.

FIG. 3*b* schematically shows withdrawal of liquid from a vial. To withdraw liquid from the vial 16 and transfer it into the liquid chamber 30 of syringe 12 the drug transfer assembly 10 must be inverted and held vertically with the vial 16 in an upside-down position as shown FIG. 3*b*. For this operation, when apparatus 10 is assembled and the piston 28 in syringe 12 is pulled in the proximal direction, a state of negative pressure is created in liquid chamber 30 and liquid is sucked into it through conduit 40. Simultaneously the volume of air chamber 32 is reduced and air is forced out of it through conduit 38 into the vial (in FIG. 3*b* are shown the air bubbles created by the air entering the vial from air chamber 40). As described in FIGS. 3*a* and 3*b* this simultaneous transfer and replacing of equal volumes of gas and liquids respectively inside syringe and vial constitutes the closed system equalization system.

Despite the care that was taken to separate air path 42 from liquid path 44 there are two locations in the prior art assembly described in U.S. Pat. No. 8,196,614 in which these paths intersect under certain conditions allowing for the possibility of liquid to travel through the air conduit from the distal liquid chamber 30 or vial 16 to the proximal air chamber.

Specifically, in the prior art apparatus described in U.S. Pat. No. 8,196,614 there is a direct connection between the air and liquid channels:

A. inside the double membrane seal actuator 34, when the syringe 12 and attached connection section 14 are not connected to any other fluid transfer component; and B. B. inside the vial 16 at the tip of the spike, when the apparatus 10 is assembled as shown in FIG. 1.

When part of the liquid does accidently find its way into the air chamber of the syringe, in addition to the obvious problems of esthetics, additional time consuming working steps become necessary to retrieve the drug and correct the dosage.

An example of a scenario when situation A is relevant is when the syringe contains liquid and is being handled, for example when being transported from the pharmacy to the ward. At such a time the piston rod might be accidentally pushed causing some of the drug to migrate to the proximal air chamber above the piston from where it cannot be expelled from the syringe. In such case the plunger needs to be pulled back in order to retrieve the drug, which is an extra work step and the wet residuals in the air chamber 32 cause an aesthetic problem.

An example of a scenario when situation B is relevant is when, during withdrawal of a liquid drug from a vial which is in a typical upside-down position, a bubble of air is seen to enter the liquid chamber of the syringe or when the syringe has been filled with more than the desired volume of liquid. In these situations, accidental pushing on the piston rod to return liquid or bubble to the vial will also cause some liquid to be forced through the air channel into the air chamber in the syringe. The way to remove the bubble is a relatively time consuming and complex procedure involving disconnecting the syringe from the vial and reconnecting it. Special attention is required to avoid pushing the plunger accidentally, which slows down the speed of work.

PCT patent application W02014/122643 to the inventor of the present invention describes improvements to the previously described drug transfer devices that minimize or eliminate the above mentioned limitations. Amongst the improvements taught in W02014/122643 are embodiments of the drug transfer apparatus that comprises a hydrophobic filter inserted in the air channel in at least one location between the air chamber in the syringe and the fluid transfer component and improved vial adaptors.

The inserted filter in the vial adaptor serves as barrier between the liquid and air channels, thus preventing the transfer of liquid through the air channels to the air chamber formed at the back of the syringe. Due to insertion of such barrier the user is free to push small air bubbles or correct small over dosage back into the vial during withdrawal procedure without being concerned that the drug might migrate to the air chamber. On one hand working with filter barrier seems to be an advantage but on the other hand the user is motivated to some negligence and it can be expected that users will not clear the filter from liquid before disconnecting the syringe from the vial and some pressure differentials might remain between the air and liquid chambers of the syringe. Therefore right after disconnection the pressure differentials will seek for neutralization and flow of fluids will occur from the chamber with the higher pressure to chamber with the lower pressure until equilibrium is reached. In case the lower pressure is in the air chamber, this will suck some of the liquid drug from the liquid chamber to the air chamber through the path existing between both needle tips inside the double membrane seal actuator. To avoid such migration or transfer due to accidental pushing or pulling the plunger and generally to prevent any uncontrolled migration of liquid to air the chamber, the existing path between the needle tips must be eliminated and total isolation of the needles is required.

Such isolation of the needles constitutes a design challenge. On the one hand, membrane 34*b* serves as a barrier between the open ends of the needles 38 and 40 and the environment, preventing contaminants such as microorganisms from contaminating the interior of actuator 34 and the needle tips retained in it, thereby maintaining sterility. On the other hand membrane 34*b* also protects the environment from hazardous substances. While in the previous embodiment in FIG. 1 to FIG. 3*b* where no filter barrier is used, there is no pressure differential created between the air and liquid chambers, and therefore uncontrolled migration doesn't occur, only accidental pushing or pulling can cause transfer of drug between chambers. Such accidental pushing, which (as a side note) is very common, does not create high pressure inside the double membrane seal actuator since there is free flow from chamber to chamber and high pressure cannot be maintained and collapses immediately until equilibrium is reached. Therefore the sealing properties of the elements in the actuator are never challenged with high pressure and moderate design is sufficient. On the other hand, in embodiments according to W02014/122643 (see for example FIG. 4 herein below) where a filter 50 is inserted as a barrier, there is a requirement for high pressure resistance due to the high pressures of up to atmospheres that can be easily generated by manually pushing the syringe plunger. This phenomenon is especially common with small volume syringes (1-5 ml). Under such pressures most of the isolation designs between the needles will fail and drug will be transferred to the air chamber or even worse, the membranes 34*a* and 34*b* cannot resist high pressures, which can cause them to detach from their seat or can cause a leak through the channels in the membranes that were created by the needles during piercing the resilient material of the membrane.

PCT patent application W02014/181320 and Israeli Patent Application No. 234746, both to the inventor of the present invention, describe needle valves that can be incorporated into the membrane actuator of the connector section 14. The needle valves prevent the possibility of liquid travel through the air conduit from the distal liquid chamber 30 or vial 16 to the proximal air chamber when the connector section 14 is not connected to a vial or other fluid transfer component. The needle valves also simplify the construction of the membrane actuator making it possible to use a single membrane actuator instead of a double membrane actuator as in the connector section shown in FIGS. 1-4.

FIG. 5*a* and FIG. 6*a* are schematic cross-sectional views of an apparatus for transferring hazardous drugs. The apparatus and all of the components shown in these figures are identical to those shown in FIG. 1 and FIG. 2*a* respectively, with two exceptions. The vial adaptor 15 comprises a filter 50, as described in W02014/122628 and the prior art double membrane seal actuator 34 in the connector section 14, which comprises two membranes 34*a* and 34*b* and arms 35, is replaced with an actuator 218 comprising an embodiment of a needle valve, only one membrane 34*b*, and arms 35. It is important to note that it is not necessary to seal the proximal end of actuator 218 in any fashion because the task of enclosing the ports 204 at the distal ends of the air and liquid conduits when the connector is not connected to another fluid transfer component, which in the prior art was accomplished by membranes 34*a* and 34*b*, is accomplished in the single membrane actuator by the needle valve arrangement and membrane 34*b* alone and in some embodiments by the needle valve itself.

FIG. 5*a* shows syringe 12 attached to connector section 14 and vial adaptor connected to drug vial 16. FIG. 6*a* shows all components of the apparatus connected together. FIG. 5*b* and FIG. 6*b* are enlarged views of the actuator in the apparatus shown in FIG. 5*a* and FIG. 6*a* respectively.

Referring to FIG. 5*b* and FIG. 6*b*, actuator 218 comprises a valve seat 208 comprising two bores through which the needles of air conduit 38 and liquid conduit 40 pass. It is noted that embodiments of actuator 218 are also described that contain one bore for use in liquid transfer apparatus that comprises only one needle 40.

When the syringe and attached connector are not connected to any other component of the apparatus, as shown in FIG. 5*b*, the actuator 218 is at the distal end of connector section 14 and the tips of needles 38 and 40 are located in the bores in the seat 208 of the needle valve. In this configuration the ports 204 in the sides of the needles are blocked by the interior walls of the bores completely isolating the needles from each other, thereby preventing air from entering the liquid chamber of the syringe or liquid from entering the air chamber.

When the syringe and attached connector are connected to another component of the apparatus, such as a vial adaptor as shown in FIG. 6*b*, the actuator 218 is pushed towards the proximal end of connector section 14. Since needles 38 and 40 are fixed to the needle holder 36, as actuator 218 moves proximally, the tips of needles 38 and 40 and ports 204 are pushed out through the distal end of the bores in the seat 208 of the needle valve, through membrane 34*b*, and through membrane 15*a* of the vial adaptor, thereby establishing open fluid paths in the respective channels.

The first goal for the connector is to completely eliminate the possibility of migration of liquid to the air chamber. This can happen, for example, if pressure differentials between the air and liquid chambers exist after disconnection from a vial adaptor and if the pressure in the air chamber is lower than that in the liquid chamber, resulting in undesired migration of liquid to the air chamber. The second goal is to prevent leaks or damage to the connector during accidental pushing of the syringe plunger. One of the frequently performed drug transfer operations in hospital settings is known as IV push or bolus injection. Typically the required amount of drug is prepared in a syringe in the hospital pharmacy and delivered to the ward where a qualified nurse administers the drug to the patient through a previously established IV line. A common problem associated with the procedure is that during the trip from pharmacy to ward or at bedside the piston of the syringe is sometimes unintentionally pushed expelling some of the drug from the barrel of the syringe or the piston is unintentionally pulled. High pressures of up to 20 atmospheres can be easily generated by manually pushing the plunger of small volume syringes (1-5 ml). Such pressure may cause the connector to disintegrate or the membranes to be detached. The connector shown in FIG. 5*a* through FIG. 6*b* is proposed as a solution to the problems associated with such unintended transfer of fluids between the air and liquid chambers and to resist high pressures created during accidental pushing the of plunger. As can be seen in these figures, when the connector 14 is not connected to the adapter 15, the ports 204 at the distal end of needles 38 and 40 that allow exchange of fluid between the surroundings and the hollow interiors of the needles are blocked by the interior of the bore in seat 208 of the needle valve. If the syringe is filled or partially filled with liquid, then if a force is exerted to try to push the plunger forward and to force liquid to flow through the needle, no liquid can exit the needle through port 204. Conversely, if a force is exerted to pull the plunger backwards no air can enter through port 204 and flow through the interior of the needle into the barrel of the syringe.

The actuators 218 described in W02014/181320 and IL234746 are identical except for the material of which seat 208 is manufactured. In W02014/181320 seat 208 is made of a rigid material such as a rigid low friction plastic, e.g. acetal. The bores in seat 208 have diameters very close to the outer diameters of needles 38 and 40 so that the needles slidingly fit into the bores in the seat while preventing passage of liquid or air molecules into or out of the interior of the needles when the tips of the needles are in the bores. The diameters of the shaft and the bores require fine tuning during the product development phase, since a tighter bore causes higher friction and higher pressure resistance, while a less tight bores causes less friction and moderate pressure resistance. The surface quality of the needles as well as the lubricant applied during the manufacture process influences the amount of friction. Materials such as acetal have excellent low friction properties and allow the valve to function even after the lubricant has been removed due to repeated connections and exposure to aggressive substances in the drugs.

In IL234746 seat 208 is made of a resilient material such as PVC. The bores in seat 208 have diameters slightly smaller than the outer diameters of needles 38 and 40 so that when the needles are pushed into the bores the resilient material of the bore pushes radially against the outer surface of the needle sealing the ports 24 preventing passage of liquid or air molecules into or out of the interior of the needles. Each specific system may use a different tolerance in the difference between the diameters of the needles and the bores, balancing between the maximal force allowed to move the needle so as to maintain user's convenience, and the pressure resistance desired of the valve to prevent leaks, so as to maintain safety. The entire seat may be made of resilient material or seat 208 may be made of a rigid material with a sleeve made of resilient material that fits into a channel of larger diameter provided in the seat.

The advantages and disadvantages of the two types of seat complement each other. On the one hand, the seat made of rigid material is very resistant to leaking at high pressures but it is difficult and expensive to manufacture to the high tolerances required. On the other hand, the seat made of resilient material is relatively easy and inexpensive to manufacture but is prone to potential leakage at high pressures.

It is a purpose of the present invention to provide septum actuators of different designs that employ the previously developed needle valves in novel configurations.

Further purposes and advantages of this invention will appear as the description proceeds.

SUMMARY OF THE INVENTION

In a first aspect, the invention is a septum holder. The septum holder comprises: a body having a disk shaped annular upper body part and a lower body part; at least one resilient elongated arm terminating with a distal enlarged element attached to the side of the body; and a septum fitted into the lower body part so that it extends downward parallel to the at least one arm.

The septum is made of a single piece of cylindrically shaped resilient material. The upper part of the septum has a diameter larger than the middle part of the septum in order to form a flange that rests on an annular ledge created around the inside of the bottom section of the body when the middle part of septum slides through the open center at the bottom of the bottom section. The lowest part of the septum has a diameter that matches that of a septum in a fluid transfer component. The septum comprises at least one bore that functions as the seat of a needle valve created part of the way through the height of the middle part of the septum.

In the septa holder of the first aspect of the invention, the septum is held to the body by pushing the upper section of body the onto the lower section of the body when the flange of the septum rests on the annular ledge created around the inside of the bottom section of the body and holding the upper and lower sections of the body permanently together with the septum held between them. The upper and lower sections of the body can be permanently held together with the septum held between them by one of: press fitting, gluing, snap fitting, ultrasonic forming, and laser or ultrasonic welding.

In a second aspect the invention is a syringe connector section for a liquid transfer apparatus. The syringe connector section comprises: a cylindrical body adapted to be attached to syringe. The body has a shoulder portion at its distal end; at least one hollow needle having at least one port that allows fluid communication between the exterior and the hollow interior of the needle at the lower end of the needle adjacent to its pointed distal tip, the needle fixedly attached to the upper end of the body of the connector section; and a septum holder according to the first aspect of the invention located inside of the cylindrical body of the connector section; When the syringe connector section is not connected to another element of the liquid transfer system, the distal enlarged element of the at least one arm of the septum holder is engaged in the shoulder portion at the distal end of body of the syringe connector and the distal end of the at least one needle is inserted into the at least one bore in the septum of the septum holder.

In the syringe connector section of the second aspect of the invention the diameter of the at least one bore is smaller than the outer diameter of the shaft of the at least one needle and therefore, when not connected to another element of the liquid transfer system, the resilient material of which the septum is manufactured pushes radially against the shaft of the needle sealing the port at the lower end of the needle preventing fluids from entering or exiting the interior of the needle and the tip of the needle is isolated from the outside by the septum of the septum holder.

Embodiments of the syringe connector section of the second aspect of the invention used with closed system liquid transfer apparatus comprises two needles, and the septum comprise two bores created part of the way through the height of the middle part of the septum the bores functioning as the seats of needle valves.

In a third aspect the invention is a septum holder comprising: a body having a disk shaped annular upper body part and a lower body part, at least one resilient elongated arm terminating with a distal enlarged element attached to the side of the body, and a septum fitted into the lower body part so that it extends downward parallel to the at least one arm. The septum is made of a single piece of cylindrically shaped resilient material. The upper part of the septum has a diameter larger than the middle part of the septum in order to form a flange that rests on an annular ledge created around the inside of the bottom section of the body when the middle part of septum slides through the open center at the bottom of the bottom section. The lowest part of the septum has a diameter that matches that of a septum in a fluid transfer component. The septum comprises a cavity created in its middle part into which an insert comprising at least one bore that functions as the seat of a needle valve is inserted.

In the septum holder of the third aspect the septum is held to the body by pushing the upper section of the body onto the lower section of the body when the flange of the septum rests on the annular ledge created around the inside of the bottom section of the body and holding the upper and lower sections of the body permanently together with the septum held between them. The upper and lower sections of the body can be permanently held together with the septum held between them by one of: press fitting, gluing, snap fitting, ultrasonic forming, and laser or ultrasonic welding.

In the septum holder of the third aspect the insert can be made of one of wither a resilient material or a rigid material.

In a fourth aspect the invention is a syringe connector section for a liquid transfer apparatus. The syringe connector section comprises a cylindrical body adapted to be attached to syringe. The body has a shoulder portion at its distal end; at least one hollow needle having at least one port that allows fluid communication between the exterior and the hollow interior of the needle at the lower end of the needle adjacent to its pointed distal tip that is fixedly attached to the upper end of the body of the connector section; and a septum holder according to the third aspect of the invention located inside of the cylindrical body of the connector section. When the syringe connector section is not connected to another element of the liquid transfer system, the distal enlarged element of the at least one arm of the septum holder is engaged in the shoulder portion at the distal end of the body of the syringe connector and the distal end of the at least one needle is inserted into the at least one bore in the insert in the septum of the septum holder.

When the syringe connector of the fourth aspect of the invention is not connected to another element of the liquid transfer system, the sides of the at least one bore in the insert in the septum push against the shaft of the at least one needle sealing the port at the lower end of the needle preventing fluids from entering or exiting the interior of the needle and the tip of the at least one needle is isolated from the outside by the septum of the septum holder.

Embodiments of the syringe connector section of the fourth aspect of the invention used with a closed system comprise two needles, and the insert in the septum comprises two bores functioning as the seats of needle valves.

In a fifth aspect the invention is a septum holder comprising: a disk shaped annular body having a cylindrical bottom part that projects downward, a cavity created in the bottom part of the body, an insert comprising at least one bore that forms the seat of a needle valve fitted into the cavity, at least one resilient elongated arm attached to the side of the body and projecting downward and terminating with a distal enlarged element, and a septum. The septum is made of a single piece of cylindrically shaped resilient material. The upper part of the septum has a hollow interior forming a cylindrical recess having an inner diameter no larger than that of the outer diameter of the cylindrical section at the bottom of the body of the septum holder, the lowest part of the septum has a diameter that matches that of a septum in a fluid transfer component. The septum is adapted to be pushed over the bottom part of the body of the septum holder until the solid part of the septum below the recess butts against the bottom of the at least one bore in the insert.

In embodiments of the septum holder of the fifth aspect of the invention the septum is fixedly held on the body of the septum holder in one of the following ways: the resilient material of the septum may be strong enough to grip the sides of the cylindrical section at the bottom of the septum holder body to hold the septum in place; the cylindrical section at the bottom of the septum holder body may have threads or teeth, or an equivalent structure created on its outer surface and the septum may have a similar structure on the inner diameter of its hollow interior so that the two structures interlock when the septum is pushed over the bottom part of body; by gluing; by ultrasound forming; and by laser or ultrasound welding.

In the septum holder of the fifth aspect of the invention the insert can be made of one of: a resilient material and a rigid material.

In a sixth aspect the invention is a syringe connector section for a liquid transfer apparatus. The syringe connector section comprises: a cylindrical body having a shoulder portion at its distal end and adapted to be attached to a syringe. The body comprises at least one hollow needle fixedly attached to the upper end of the body of the connector section. The needle has at least one port that allows fluid communication between the exterior and the hollow interior of the needle at the lower end of the needle adjacent to its pointed distal tip. The syringe connector section also comprises a septum holder according to the fifth aspect of the invention located inside of the cylindrical body of the connector section. When the syringe connector is not connected to another element of the liquid transfer system, the distal enlarged element of the at least one arm of the septum holder is engaged in the shoulder portion at the distal end of the body of the syringe connector and the distal end of the at least one needle is inserted into the at least one bore in the insert in the body of the septum holder.

When the syringe connector section of the sixth aspect of the invention is not connected to another element of the liquid transfer system, the sides of the at least one bore in the insert in the body of the septum holder push against the shaft of the at least one needle sealing the port at the lower end of the needle preventing fluids from entering or exiting the interior of the needle and the tip of the at least one needle is isolated from the outside by the septum of the septum holder.

Embodiments of the syringe connector section of the sixth aspect of the invention used with a closed system comprise two needles and the insert in the body of the septum holder comprises two bores functioning as the seats of needle valves.

In a seventh aspect the invention is a septum holder comprising: a body having a disk shaped annular lower body portion and an upper body portion comprised of at least two vertical posts and at least one horizontal bar. An insert comprising at least one bore that forms the seat of a needle valve is fixedly supported between the at least one horizontal bar in the upper body section and the bottom section of the septum holder body. The septum holder also comprises at least one resilient elongated arm terminating with a distal enlarged element attached to the sides of body and a septum attached to and extending downward from the bottom of the body of the septum housing parallel to the at least one arm. The septum is made of a single piece of cylindrically shaped resilient material comprising an upper part that is attached to the bottom of the body and a lower part having a diameter that matches that of a septum in a fluid transfer component.

In the septum holder of the seventh aspect of the invention the septum is held fixedly in a seat created around the inside of the bottom portion of the body of the septum holder by at least one of: press fitting, gluing, snap fitting, ultrasonic forming, and laser or ultrasonic welding.

In the septum holder of the seventh aspect of the invention the insert can be made of one of: a resilient material and a rigid material.

In an eighth aspect the invention is a syringe connector section for a liquid transfer apparatus. The syringe connector section comprises: a cylindrical body adapted to be attached to syringe. The body has a shoulder portion at its distal end; at least one hollow needle having at least one port that allows fluid communication between the exterior and the hollow interior of the needle at the lower end of the needle adjacent to its pointed distal tip that is fixedly attached to the upper end of the body of the connector section; and a septum holder according to the seventh aspect of the invention located inside of the cylindrical body of the connector section. When the syringe connector section is not connected to another element of the liquid transfer system, the distal enlarged element of the at least one arm of the septum holder is engaged in the shoulder portion at the distal end of the body of the syringe connector and the distal end of the at least one needle is inserted into the at least one bore in the insert in the body of the septum holder.

When the syringe connector section of the eighth aspect of the invention is not connected to another element of the liquid transfer system, the sides of the at least one bore in the insert in the body of the septum holder push against the shaft of the at least one needle sealing the port at the lower end of the needle preventing fluids from entering or exiting the interior of the needle and the tip of the at least one needle is isolated from the outside by the septum of the septum holder.

Embodiments of the syringe connector section of the sixth aspect of the invention used with a closed system comprise two needles and the insert in the body of the septum holder comprises two bores functioning as the seats of needle valves.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The present invention is embodiments of septum holders for use in syringe connectors that are used to connect syringes to other elements of liquid transfer apparatuses. All of the embodiments of the septum holders described herein comprise a septum holder body, at least one resilient elongated arm that terminates with a distal enlarged element attached to the sides of the body, and a septum. The septum holders of the invention are characterized in that they comprise at least one bore that functions as the seat of a needle valve. The bore is created in the septum or in an insert fixed in either the body of the septum holder or in the septum. The septum holders of the invention are also characterized in that the septum is attached to the bottom of the body of the septum holder projecting downwards parallel to the at least one elongated arm.

The embodiments of the septum holder that are described herein below all have two bores for use in syringe connectors that comprise two hollow needles, they also have two resilient arms attached to the body part. However it is to be understood that these same embodiments can be manufactured mutatis mutandis with only one bore to be used with syringe connectors that comprise one hollow needle and one, three, or more arms. Also it is apparent that in embodiments where the two arms are shown attached to the sides of the body at a certain location, it would require only a simple modification to attach them at other locations.

Figure 1:
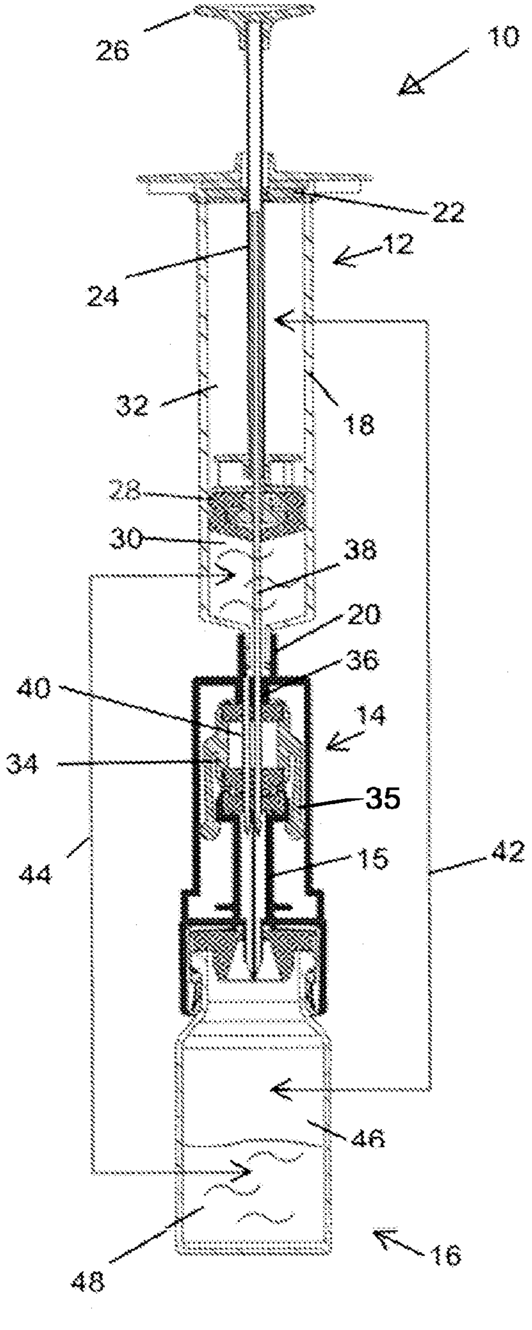
PRIOR ART Fig. 1
FIG. 1 is a schematic cross-sectional view of a prior art apparatus for transferring hazardous drugs.
Figure 2A:
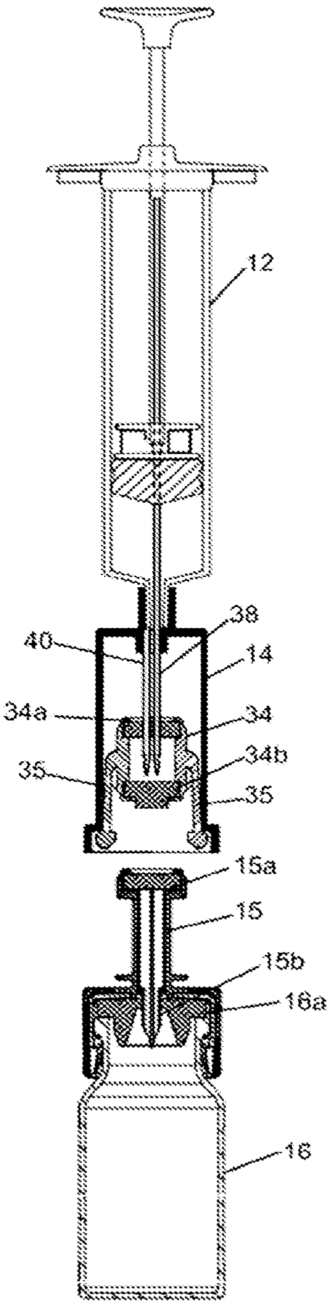
FIG. 2*a* to FIG. 2*d* are cross-sectional views that schematically show the 4 steps connection sequence between the connector section and the vial adaptor of the apparatus of FIG. 1.
Figure 2B:
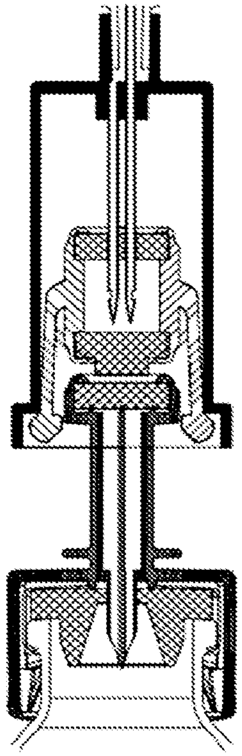
PRIOR ART Fig. 2b
Figure 2C:
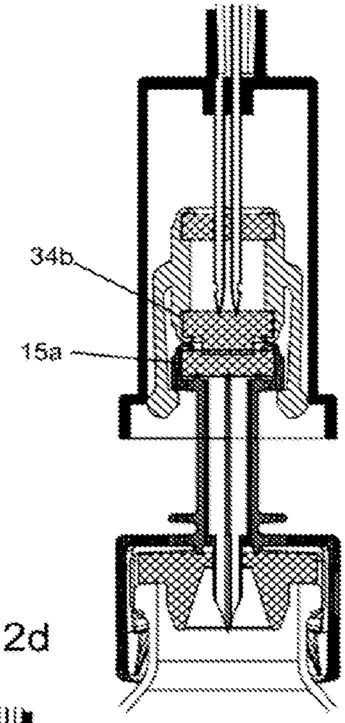
PRIOR ART Fig. 2c
Figure 2D:
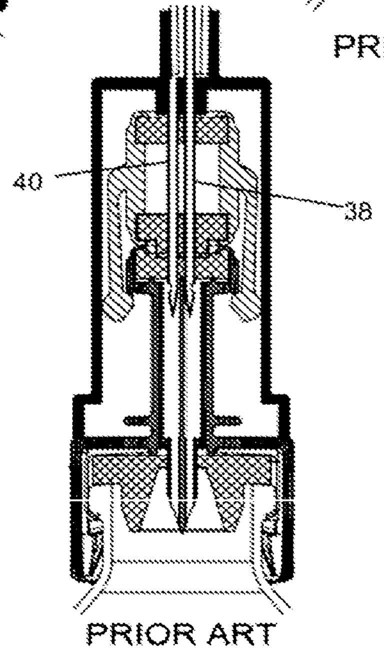
PRIOR ART Fig. 2d
Figure 3A:
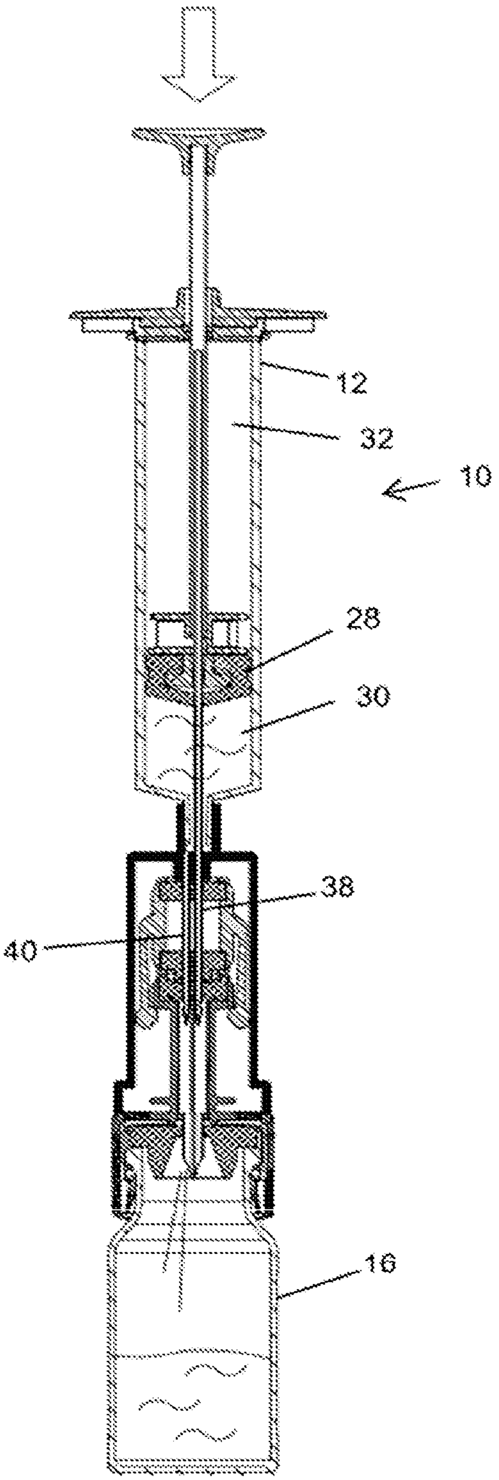
FIG. 3*a* and FIG. 3*b* are cross-sectional views that schematically show the concept of using the apparatus of FIG. 1 for transferring hazardous drugs.
Figure 3B:
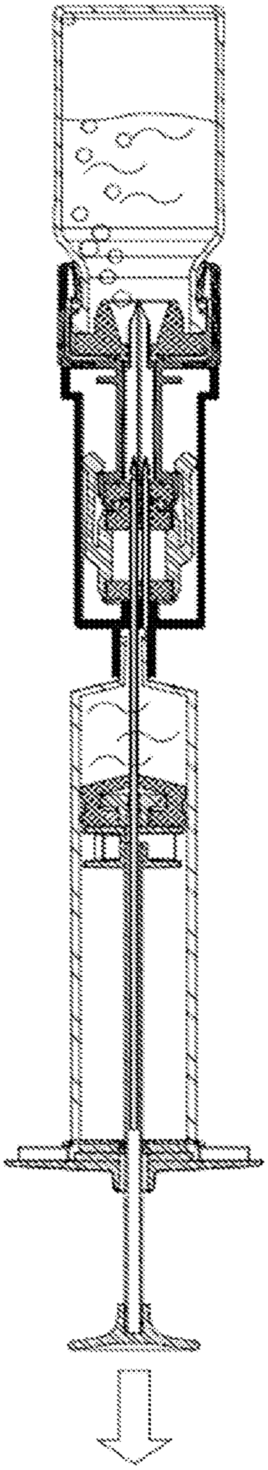
PRIOR ART Fig. 3b
Figure 4:
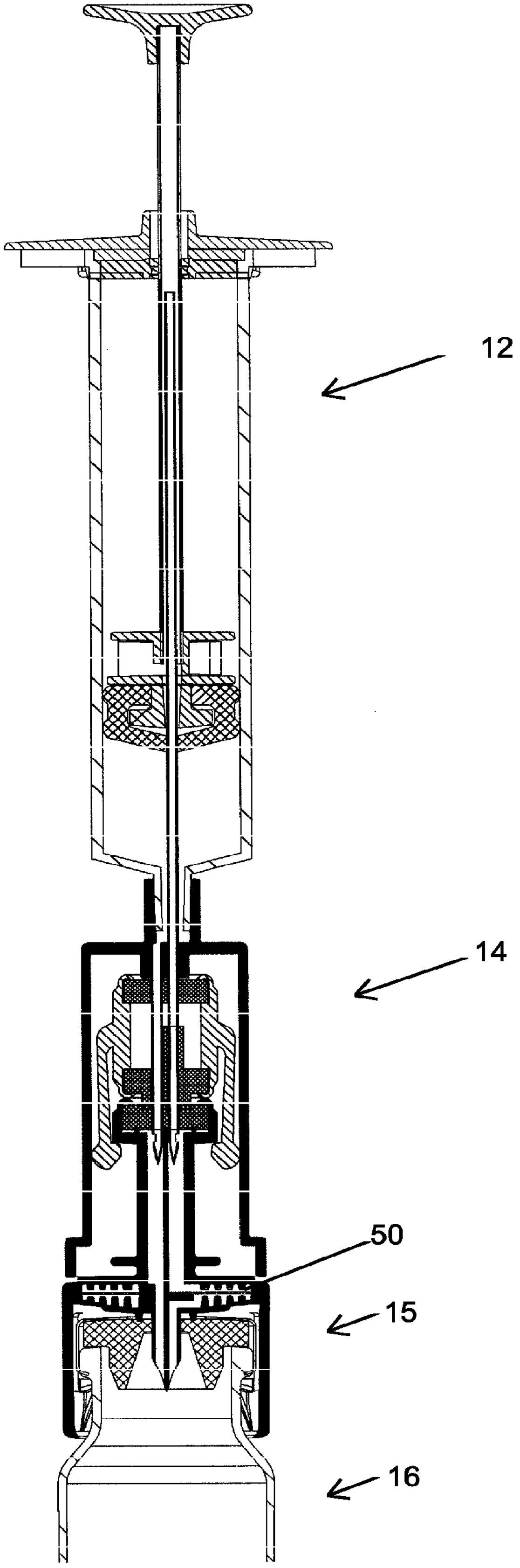
FIG. 4 shows an embodiment of the apparatus of FIG. 1 in which a filter is introduced into the air channel by placing it in the vial adaptor.
Figure 5A:
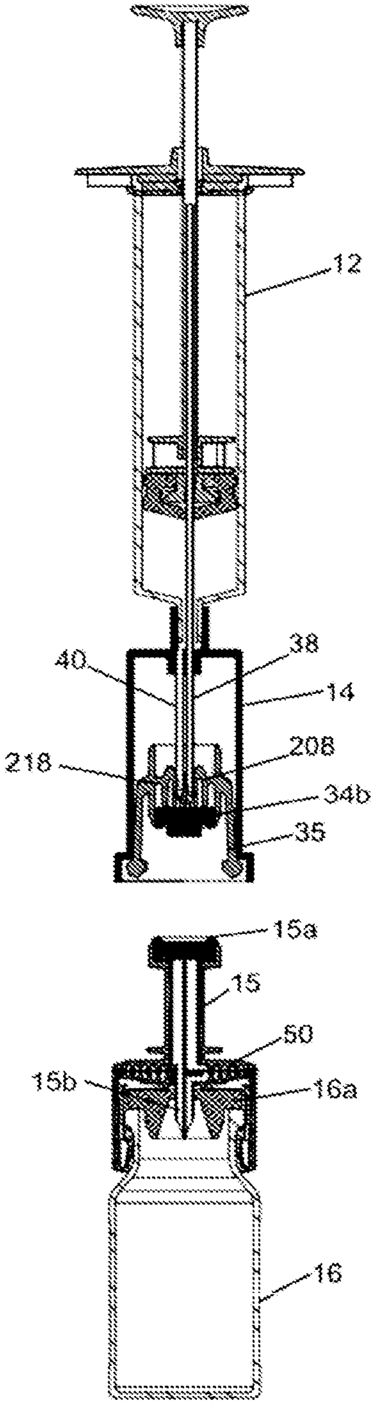
Fig. 5a PRIOR ART
FIG. 5*a* and FIG. 6*a* are schematic cross-sectional views of an apparatus for transferring hazardous drugs identical to that shown in FIG. 4 disconnected from and connected to a vial adaptor respectively, with the exception that the prior art double membrane seal actuator is replaced with an actuator comprising a single membrane and an embodiment of the needle valve described in W02014/181320 and IL234746.
Figure 5B:
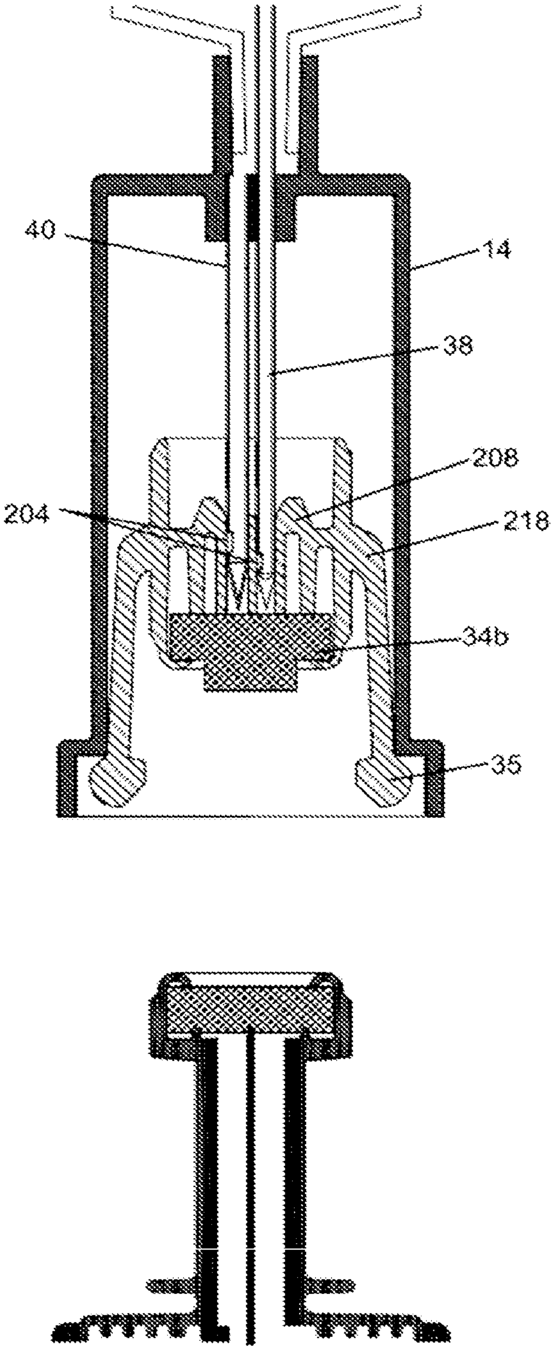
Fig. 5b PRIOR ART
FIG. 5*b* and FIG. 6*b* are enlarged views of the actuator in the apparatus shown in FIG. 5*a* and FIG. 6*a* respectively.
Figure 6A:
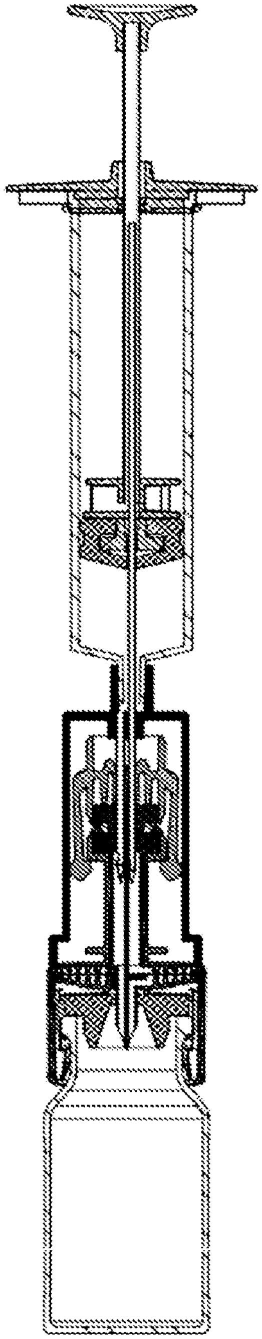
Fig. 6a PRIOR ART
Figure 6B:
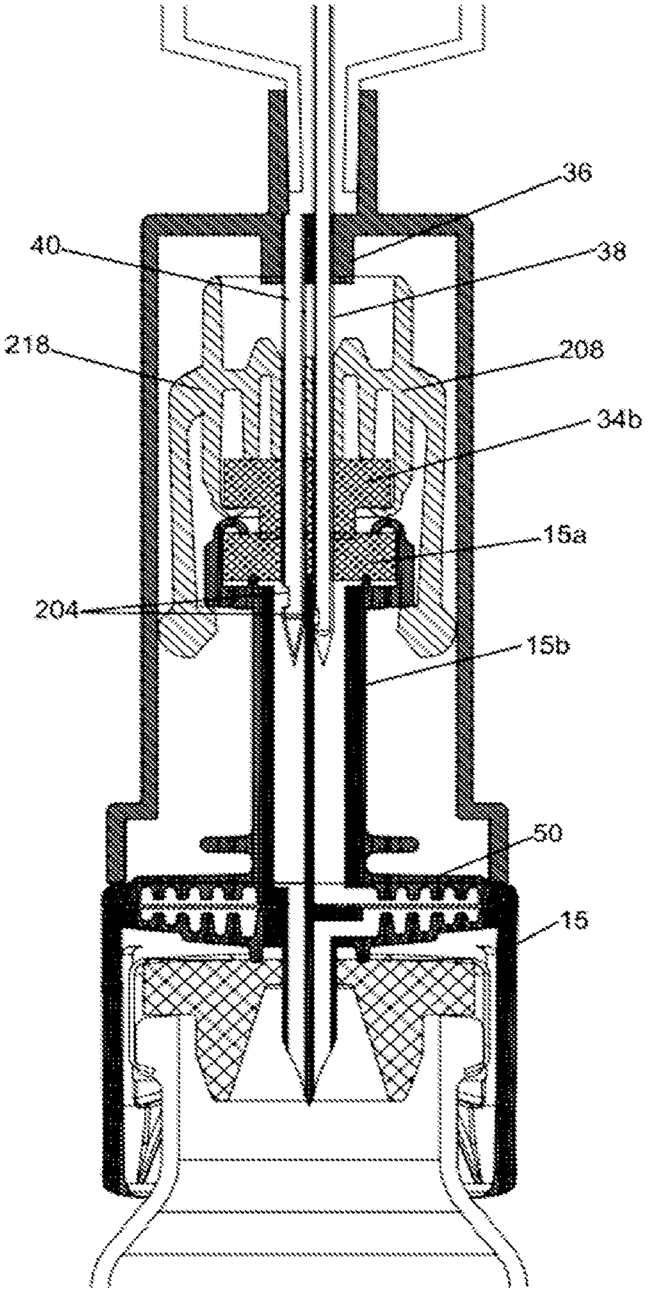
Fig. 6b PRIOR ART
Figure 7A:
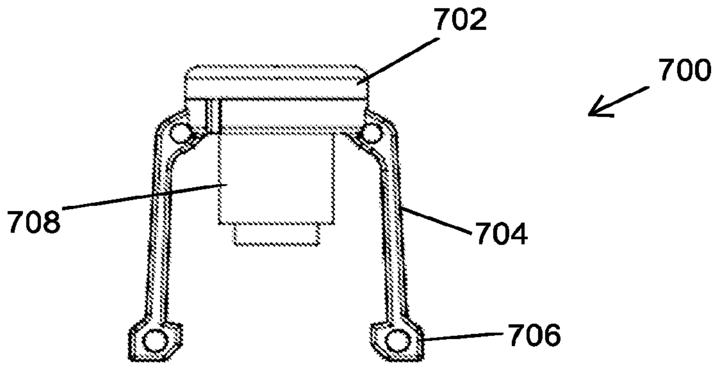
FIG. 7*a*, FIG. 7*b* and FIG. 7*c* are respectively front, cross-sectional, and exploded views of a first embodiment of a septum holder according to the invention.
Figure 7B:
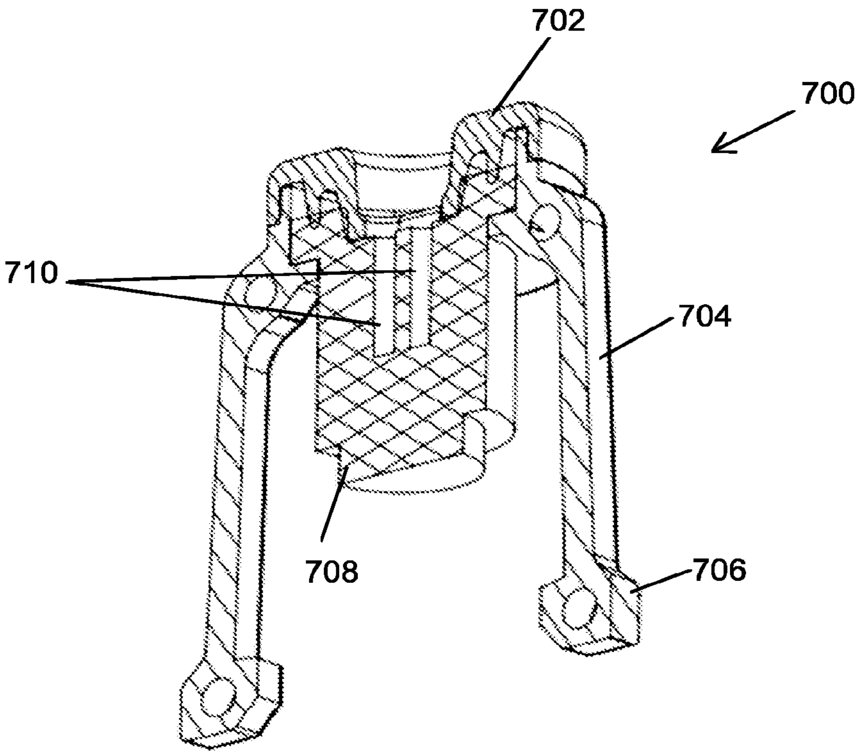
Figure 7C:
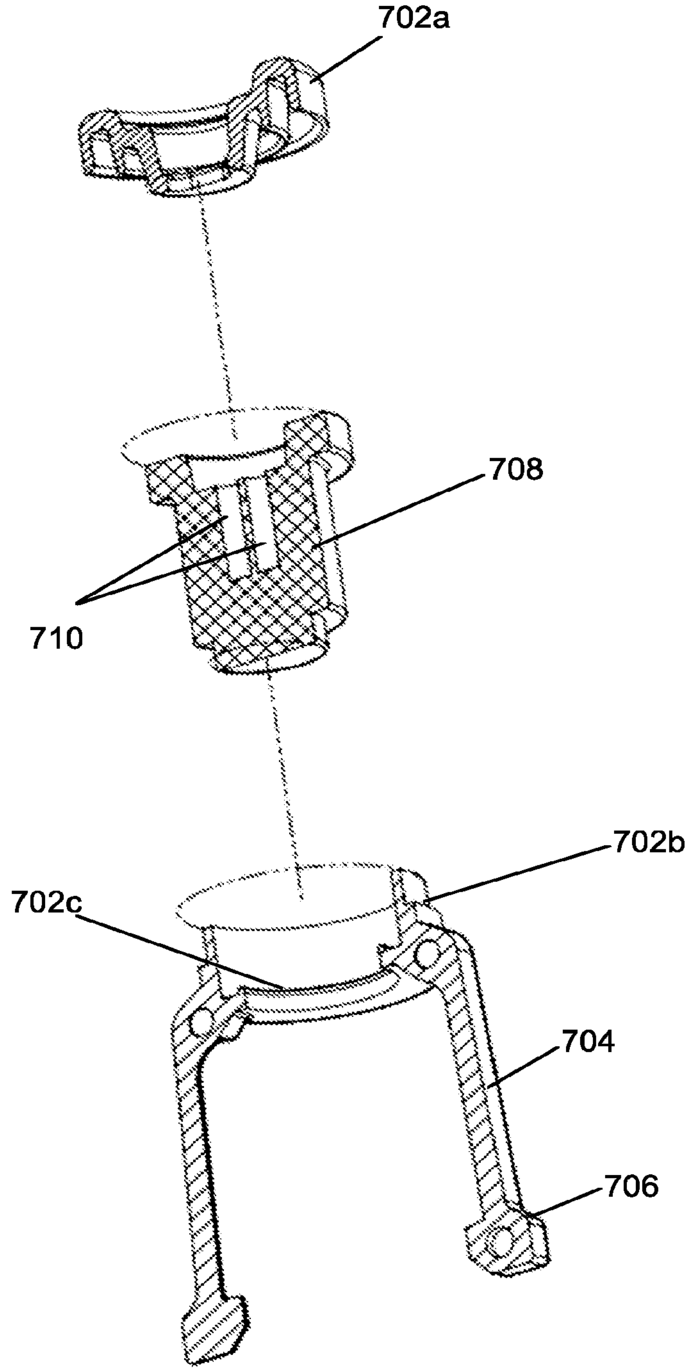

FIG. 7*a*, FIG. 7*b*, and FIG. 7*c* are respectively front, cross-sectional, and exploded views of a first embodiment of a septum holder 700 according to the invention. Septum holder 700 is comprised of a body 702 having a disk shaped annular upper body part 702*a* and a lower body part 702*b*. Two equal length resilient elongated arms 704 are attached to the sides of body 700. The arms terminate with distal enlarged elements 706.

As can be seen in exploded view of FIG. 7*c*, a septum 708 is fitted into the lower body part 702*b* so that it extends downward between arms 704. Septum 708 is made of a single piece of cylindrically shaped resilient material. The upper part of septum 708 has a diameter larger than the middle part in order to form a flange that rests on an annular ledge 702*c* created around the inside of the bottom section 702*b* of body 702 when the middle part of septum 708 slides through the open center at the bottom of bottom section 702*b*. Upper section 702*a* is then pushed onto the lower section in order to connect septum 708 to body 702. The upper and lower sections of body 702 can be held permanently together with the septum 702 held between them by any method known in the art, e.g. press fitting, gluing, snap fitting, ultrasonic forming, and laser or ultrasonic welding.

In an alternative embodiment the septum, shaped as described above can be forced into the circular opening at the bottom of the bottom section 702*b* from below and, when the flange snaps onto annular ledge 702*c* the upper section 702*a* of the body is pushed into the lower section 702*b* to hold the septum in place. In another embodiment, the upper and middle sections of the septum can have the same diameter that is at least as large as the diameter of annular ledge 702*c*. In this embodiment the septum is forced into the lower section 702*b* from the bottom. Because of the flexibility of the material of which the septum is made the upper part of the septum is at first compressed to enter the lower section of the holder and then expands to fill the space on top of ledge 702*c*.

Two bores 710 that function as the seat of a needle valve are created part of the way through the height of the middle part of septum 708. The lowest part of septum 708 has a diameter that matches that of the septum in the fluid transfer component, e.g. vial adaptor, to which it will be connected. Note that in FIGS. 7*a* to 10*d* the lower part of the septum is shown as having a diameter less than that of the rest of the septum; however, this is not always necessary and in some cases the lower part of the septum can have the same diameter as the middle part of the septum or the entire septum can have the same diameter. The only condition being that the septum in the septum holder has to be able to contact a septum in a fluid transfer component and form a seal that prevents leakage of air or liquid.

Figure 7D:
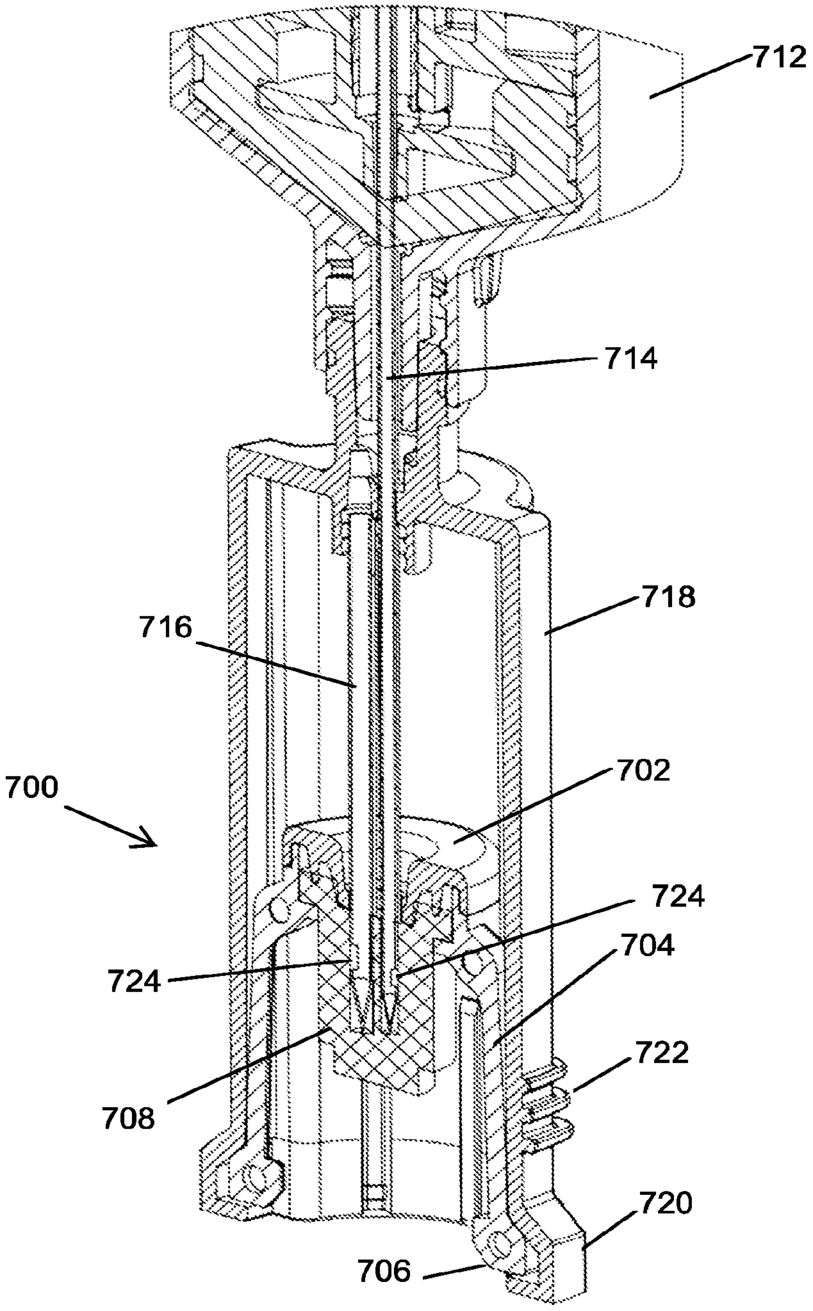
FIG. 7*d* schematically shows the holder of FIG. 7*a* in a connector section of a closed system drug transfer apparatus.

FIG. 7*d* schematically shows the holder of FIG. 7*a*, FIG. 7*b*, and FIG. 7*c* in a syringe connector section of a closed system liquid transfer apparatus. The connector section is essentially the same as that in the prior art apparatus described herein above. Cylindrical body 718 of the connector section is attached to syringe 712. Two hollow needles 714, which function as an air conduit, and 716, which functions as a liquid conduit, are fixedly attached to the upper end of body 718 of the connector section. At the lower end of the needles, adjacent to the pointed distal tips, are ports 724 that allow fluid communication between the exterior and the hollow interiors of the needles. External ridges 722 near the bottom of cylindrical body 718 serve as finger grips for use when attaching the connector section and syringe to other elements of the drug transfer system. Ridges 722 are not essential and can be eliminated or replaced with other means, for example a roughened surface area, to accomplish the same purpose.

A septum holder 700 is located inside of cylindrical body 718 of the connector section. As shown, the distal ends of needles 716, 718 are inserted into bores 710 in septum 708. The diameters of bores 710 are smaller than the outer diameter of the shafts of the needles and therefore the resilient material of which the septum is manufactured pushes radially against the shaft of the needle sealing the ports 724. When not connected to another element of the liquid transfer system the distal enlarged elements 706 of arms 704 are engaged in the shoulder portion 720 at the distal end of body 718. As shown in FIG. 7*d*, in this position the tips of the needles are isolated from the outside by septum 708 and the walls of the bores 710 pressing radially inwards on the shafts of the needles prevent fluids from entering or exiting the interior of the needles.

Connection of the syringe connector to a fluid transfer component, e.g. a vial adaptor, a spike adaptor for connection to an IV bag, or a connector for connection to an IV line, is accomplished in the same manner as in the prior art described herein above. When the septum of the fluid transfer component is pushed against septum 708, septum holder 700 begins to move upwards inside body 718 and the tips of the needles begin to exit bores 710 penetrate the solid material of septum 708. The tips of the needles pass through septum 708 and the septum of the fluid transfer component as holder 700 continues to be pushed upwards, thereby establishing air and liquid channels between the element of the liquid transfer system attached to the fluid transfer component and the proximal air chamber and distal liquid chamber in the syringe.

Figure 8A:
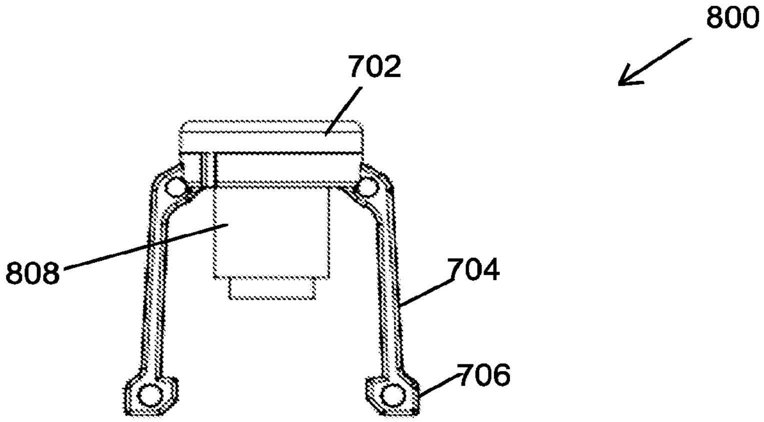
FIG. 8*a*, FIG. 8*b*, and FIG. 8*c* are respectively front, cross-sectional, and exploded views of a first embodiment of a septum holder according to the invention.
Figure 8B:
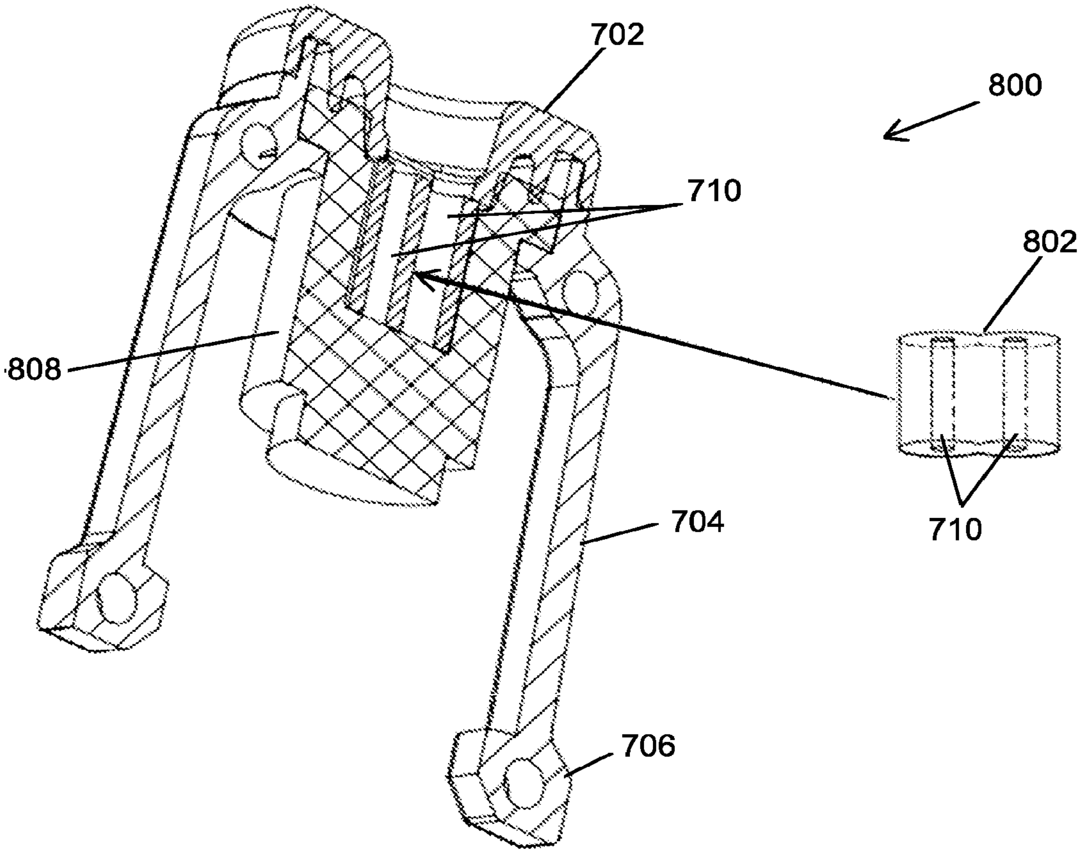
Figure 8C:
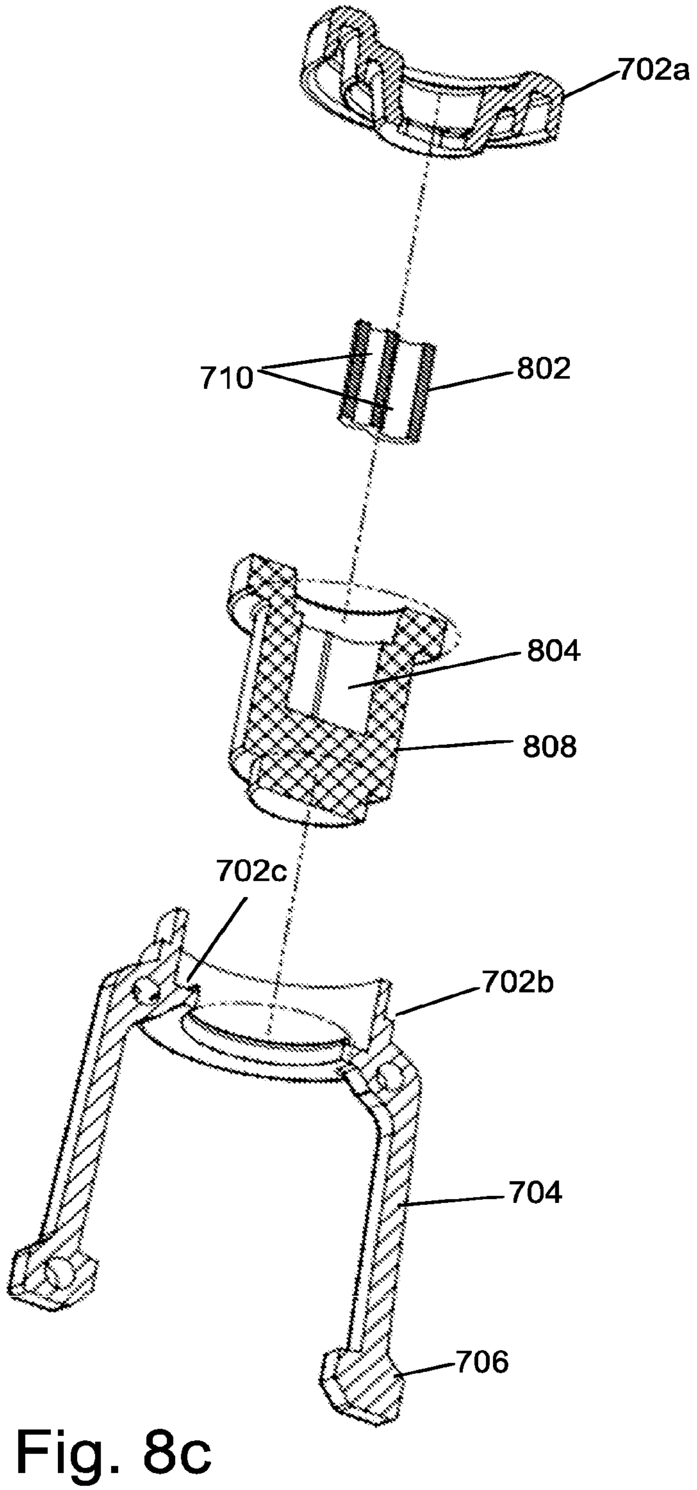

FIG. 8*a*, FIG. 8*b*, and FIG. 8*c* are respectively front, cross-sectional, and exploded views of a second embodiment of a septum holder 800 according to the invention. Septum holder 800 is comprised of a body 702 having a disk shaped annular upper body part 702*a* and a lower body part 702*b*. Two equal length resilient elongated arms 704 are attached to the sides of lower body part 702*b*. The arms terminate with distal enlarged elements 706.

As can be seen in exploded view of FIG. 8*c*, a septum 808 is fitted into the lower body part 702*b* so that it extends downward between arms 704. Septum 808 is made of a single piece of cylindrically shaped resilient material. The upper part of septum 808 has a diameter larger than the middle part in order to form a flange that rests on an annular ledge 702*c* created around the inside of the bottom section 702*b* of body 702 when the middle part of septum 808 slides through the open center at the bottom of bottom section 702*b*. Upper section 702*a* is then pushed onto the lower section in order to connect septum 808 to body 702. The upper and lower sections of body 702 can be held permanently together with the septum 808 held between them by any method known in the art, e.g. press fitting, gluing, snap fitting, ultrasonic forming, and laser or ultrasonic welding.

In an alternative embodiment the septum 808, shaped as described above can be forced into the circular opening at the bottom of the bottom section 702*b* from below and, when the flange snaps onto annular ledge 702*c* the upper section 702*a* of the body is pushed into the lower section 702*b* to hold the septum in place. In another embodiment, the upper and middle sections of the septum can have the same diameter that is at least as large as the diameter of annular ledge 702*c*. In this embodiment the septum is forced into the lower section 702*b* from the bottom. Because of the flexibility of the material of which the septum is made the upper part of the septum is at first compressed to enter the lower section of the holder and then expands to fill the space on top of ledge 702*c*.

A cavity 804 is created in the middle part of septum 808 is created into which an insert 802 is fitted. Insert 802 can be a single piece of material comprising two bores 710 that function as the seat of a needle valve as shown in FIG. 8*b*. In alternative embodiments insert 802 can have different shapes than that shown and in one embodiment can be comprised of two separate pieces of tubing that are inserted into parallel bores of appropriate diameters created into the middle part of septum 808. The lowest part of septum 808 has a diameter that matches that of the septum in the fluid transfer component, e.g. vial adaptor, to which it will be connected. This embodiment of the septum is very useful because the required elasticity properties of the septum and of the insert 802 are different. The septum itself should be very elastic with good re-sealing properties while the material of the insert must be less flexible to resist pressures on the needle ports. For example, septum 808 can be made from Polyisoprene and insert 802 from silicon.

Figure 8D:
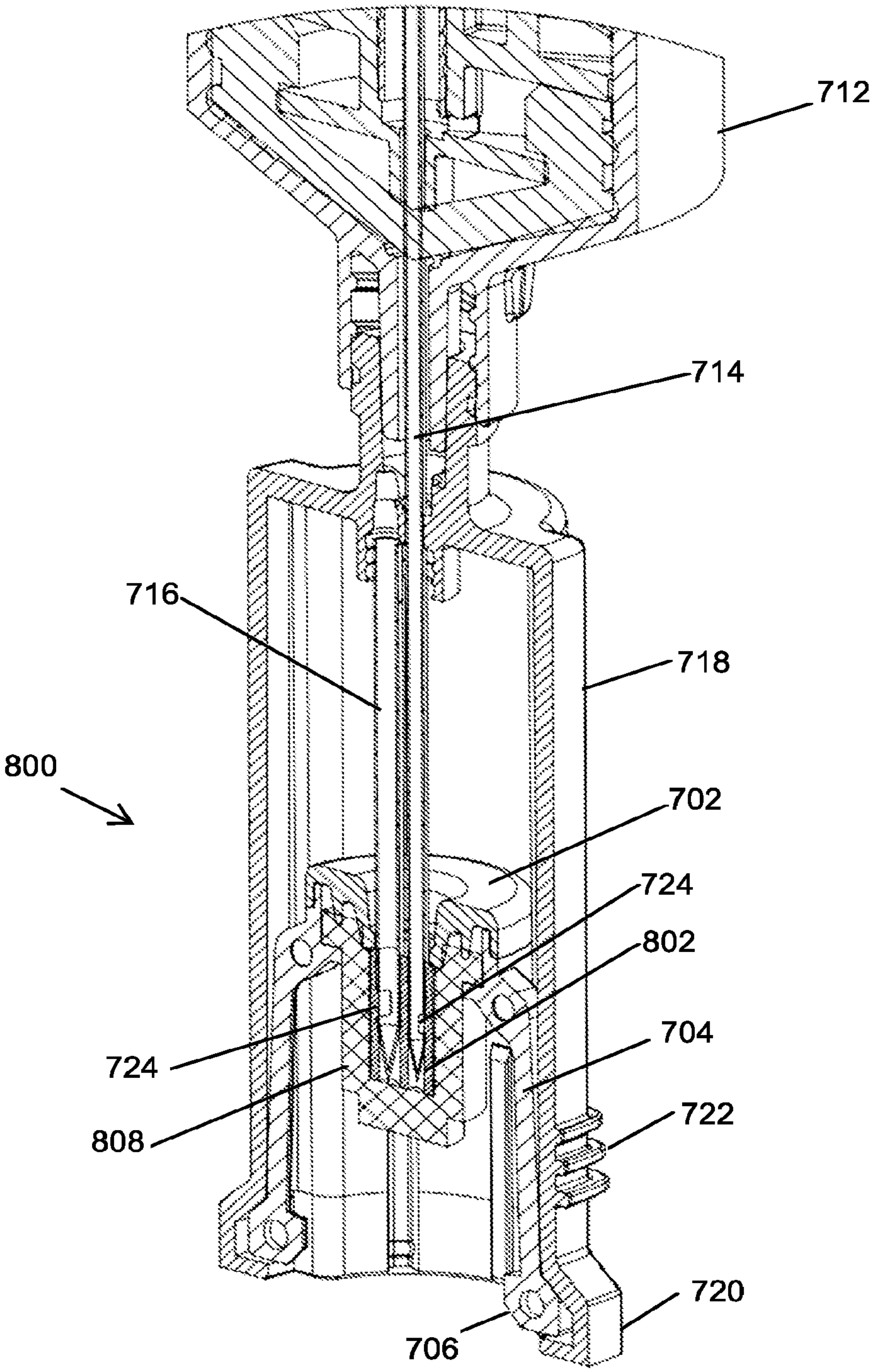
FIG. 8*d* schematically shows the holder of FIG. 8*a* in a connector section of a closed system drug transfer apparatus.

FIG. 8*d* schematically shows the holder of FIG. 8*a*, FIG. 8*b*, and FIG. 8*c* in a syringe connector section of a closed system liquid transfer apparatus. The connector section is essentially the same as that in the prior art apparatus described herein above. Cylindrical body 718 of the connector section is attached to syringe 712. Two hollow needles 714, which function as an air conduit, and 716, which functions as a liquid conduit, are fixedly attached to the upper end of body 718 of the connector section. At the lower end of the needles, adjacent to the pointed distal tips, are ports 724 that allow fluid communication between the exterior and the hollow interiors of the needles. External ridges 722 near the bottom of cylindrical body 718 serve as finger grips for use when attaching the connector section and syringe to other elements of the liquid transfer system. Ridges 722 are not essential and can be eliminated or replaced with other means, for example a roughened surface area, to accomplish the same purpose.

A septum holder 800 is located inside of cylindrical body 718 of the connector section. As shown, the distal ends of needles 716, 718 are inserted into bores 710 in insert 802 in septum 808. If insert 802 is made of resilient material, the diameters of bores 710 are smaller than the outer diameter of the shafts of the needles and therefore the resilient material of which the insert is manufactured pushes radially against the shaft of the needle sealing the ports 724. In embodiments of septum holder 800 the insert 802 can be made of a rigid material, e.g. acetal plastic. In these embodiments the diameters of the bores 710 are very close to the outer diameters of the needles and sealing of ports 724 is the result of the close manufacturing tolerances. When not connected to another element of the liquid transfer system the distal enlarged elements 706 of arms 704 are engaged in the shoulder portion 720 at the distal end of body 718. As shown in FIG. 8*c*, in this position the tips of the needles are isolated from the outside by septum 808 and the walls of the bores 710 pressing radially on the shafts of the needles prevent fluids from entering or exiting the interior of the needles.

Connection of the syringe connector to a fluid transfer component, e.g. a vial adaptor, a spike adaptor for connection to an IV bag, or a connector for connection to an IV line, is accomplished in the same manner as in the prior art described herein above. When the septum of the fluid transfer component is pushed against septum 808, septum holder 800 begins to move upwards inside body 718 and the tips of the needles begin to exit bores 710 penetrate the solid material of septum 808. The tips of the needles pass through septum 808 and the septum of the fluid transfer component as holder 800 continues to be pushed upwards, thereby establishing air and liquid channels between the element of the liquid transfer system attached to the fluid transfer component and the proximal air chamber and distal liquid chamber in the syringe.

Figure 9A:
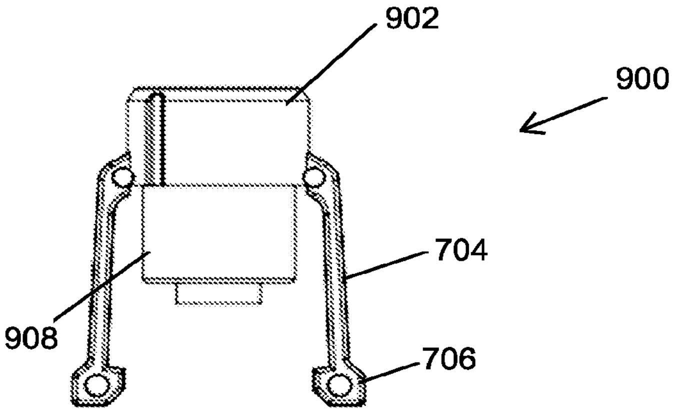
FIG. 9*a*, FIG. 9*b*, and FIG. 9*c* are respectively front, cross-sectional, and exploded views of a first embodiment of a septum holder according to the invention.
Figure 9B:
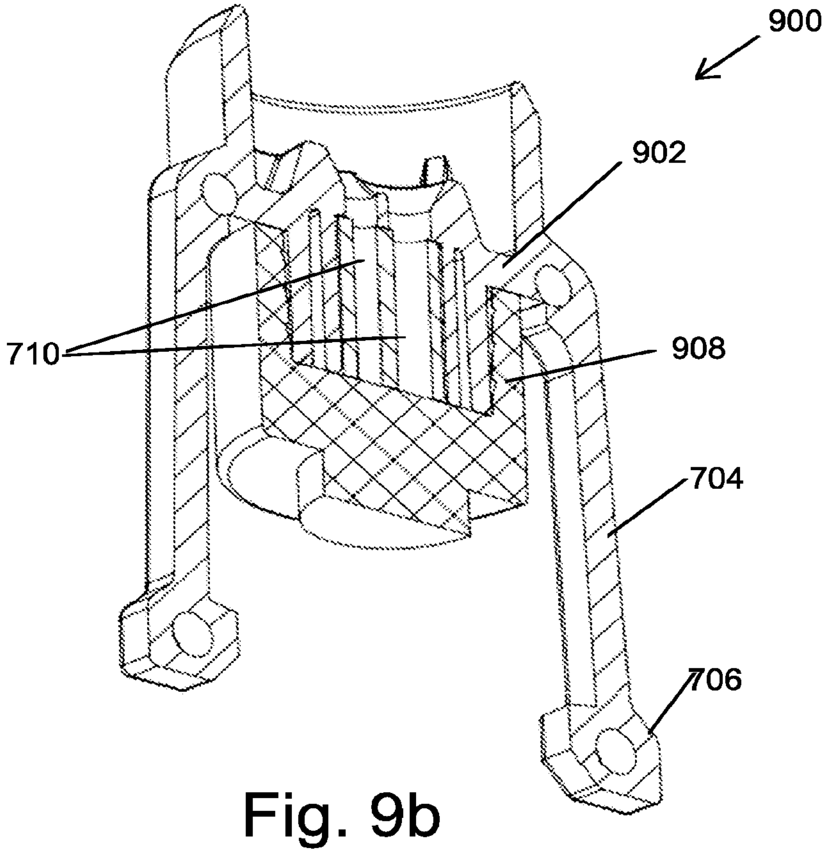
Figure 9C:
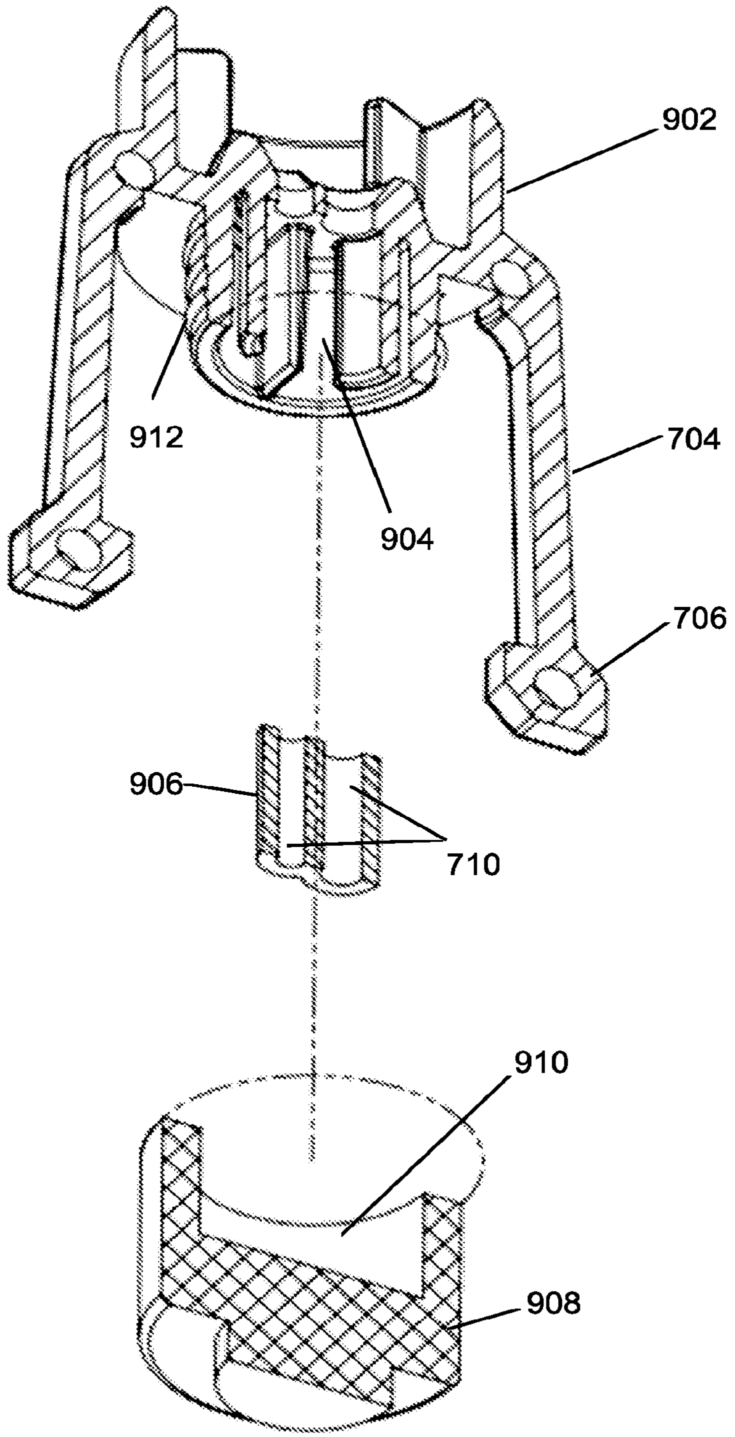

FIG. 9*a*, FIG. 9*b*, and FIG. 9*c* are respectively front, cross-sectional, and exploded views of a third embodiment of a septum holder 900 according to the invention. Septum holder 900 is comprised of a disk shaped annular body 902. Two equal length resilient elongated arms 704 are attached to the sides of body 902. The arms terminate with distal enlarged elements 706. The bottom part of body 902 is comprised of a cylindrical section that projects downward between arms 704. A cavity 904 is created in the bottom part of body 902 into which is fitted an insert 906 comprising two bores 710 that form the seat of a needle valve. In alternative embodiments insert 906 can have different shapes than that shown and in one embodiment can be comprised of two separate pieces of tubing that are inserted into parallel bores of appropriate diameters created in the bottom part of body 902. Septum 908 is made of a single piece of cylindrically shaped resilient material. The upper part of septum 908 has a hollow interior forming a cylindrical recess 910 having an inner diameter no larger than that of the outer diameter of the cylindrical section at the bottom of body 902. After insert 906 is fitted into cavity 904, septum 908 is pushed over the bottom part of body 902 until the solid part of septum 908 below recess 910 butts against the bottom of bores 710 in insert 906 thereby isolating bottoms of the interior of the bores from the external environment. Septum 908 is fixedly held on the body 902 of holder 900 by any means known in the art. For example, the resilient material of the septum may be strong enough to grip the sides of the cylindrical section at the bottom of body 902 to hold the septum in place; or, as shown in FIG. 9*c*, the cylindrical section at the bottom of body 902 may have threads or teeth, or an equivalent structure created on its outer surface and septum 908 may have similar structure on the inner diameter of its hollow interior (not shown in FIG. 9*c*) so that the two structures interlock when septum 908 is pushed over the bottom part of body 902. In other embodiments other methods, such as gluing, ultrasonic forming, or laser or ultrasound welding may be used. The lowest part of septum 908 has a diameter that matches that of the septum in the fluid transfer component, e.g. vial adaptor, to which it will be connected.

Figure 9D:
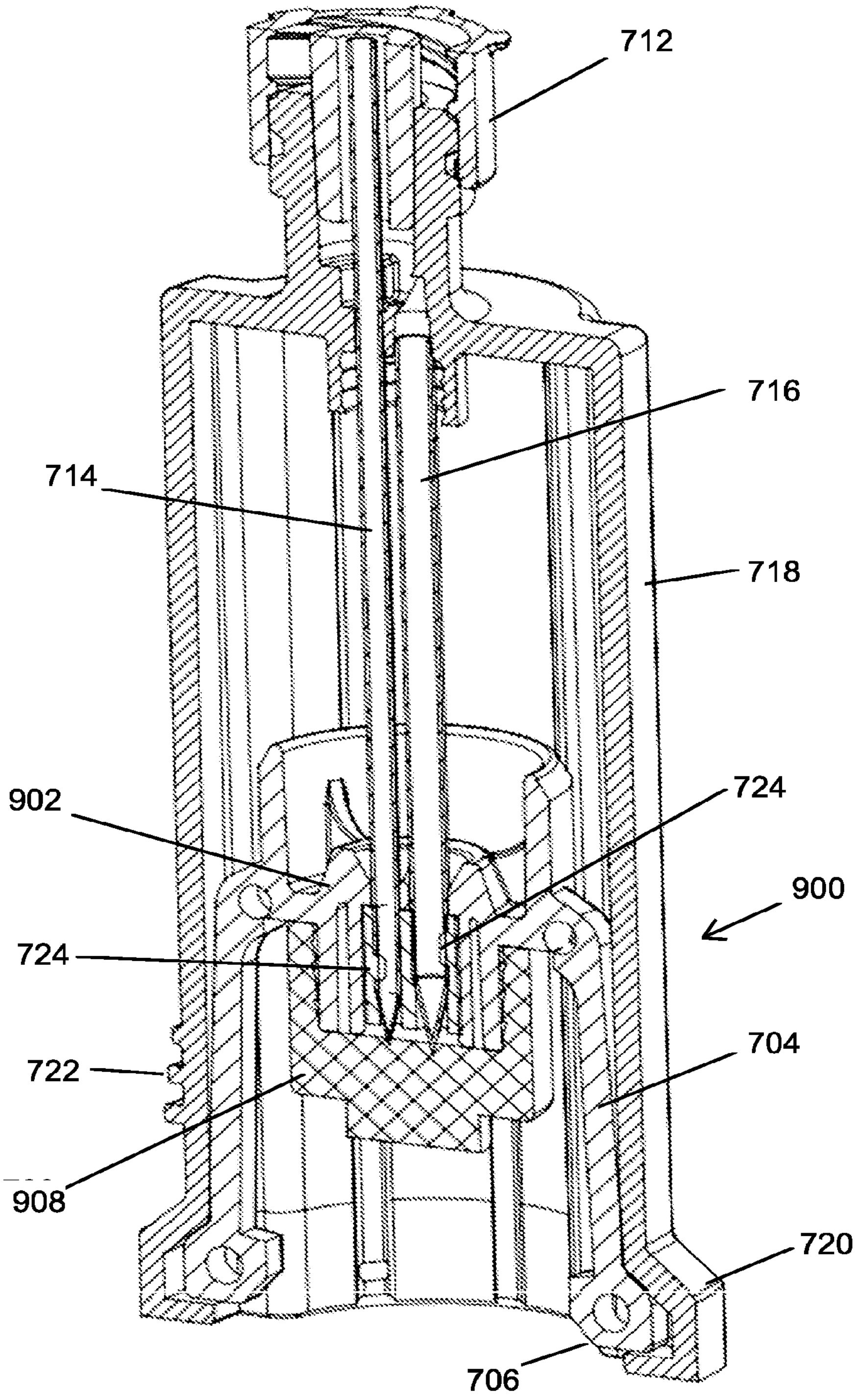
FIG. 9*d* schematically shows the holder of FIG. 9*a* in a connector section of a closed system drug transfer apparatus.

FIG. 9*d* schematically shows the holder of FIG. 9*a*, FIG. 9*b*, and FIG. 9*c* in a syringe connector section of a closed system liquid transfer apparatus. The connector section is essentially the same as that in the prior art apparatus described herein above. Cylindrical body 718 of the connector section is attached to syringe 712. Two hollow needles 714, which function as an air conduit, and 716, which functions as a liquid conduit, are fixedly attached to the upper end of body 718 of the connector section. At the lower end of the needles, adjacent to the pointed distal tips, are ports 724 that allow fluid communication between the exterior and the hollow interiors of the needles. External ridges 722 near the bottom of cylindrical body 718 serve as finger grips for use when attaching the connector section and syringe to other elements of the drug transfer system. Ridges 722 are not essential and can be eliminated or replaced with other means, for example a roughened surface area, to accomplish the same purpose.

A septum holder 900 is located inside of cylindrical body 718 of the connector section. As shown, the distal ends of needles 716, 718 are inserted into bores 710 in insert 906. If the insert 906 is made of a flexible material, e.g. silicon, the diameters of bores 710 are smaller than the outer diameter of the shafts of the needles and therefore the resilient material of which the insert is manufactured pushes radially against the shaft of the needle sealing the ports 724. When not connected to another element of a liquid transfer system the distal enlarged elements 706 of arms 704 are engaged in the shoulder portion 720 at the distal end of body 718. As shown in FIG. 9*d*, in this position the tips of the needles are isolated from the outside by 34 septum 908 at the bottom and the walls of the bores 710 pressing radially on the shafts of the needles prevent fluids from entering or exiting the interior of the needles.

Connection of the syringe connector to a fluid transfer component, e.g. a vial adaptor, a spike adaptor for connection to an IV bag, or a connector for connection to an IV line, is accomplished in the same manner as in the prior art described herein above. When the septum of the fluid transfer component is pushed against septum 908, septum holder 900 begins to move upwards inside body 718 and the tips of the needles begin to exit bores 710 penetrate the solid material of septum 908. The tips of the needles pass through septum 908 and the septum of the fluid transfer component as holder 900 continues to be pushed upwards, thereby establishing air and liquid channels between the element of the liquid transfer system attached to the fluid transfer component and the proximal air chamber and distal liquid chamber in the syringe.

Figure 10A:
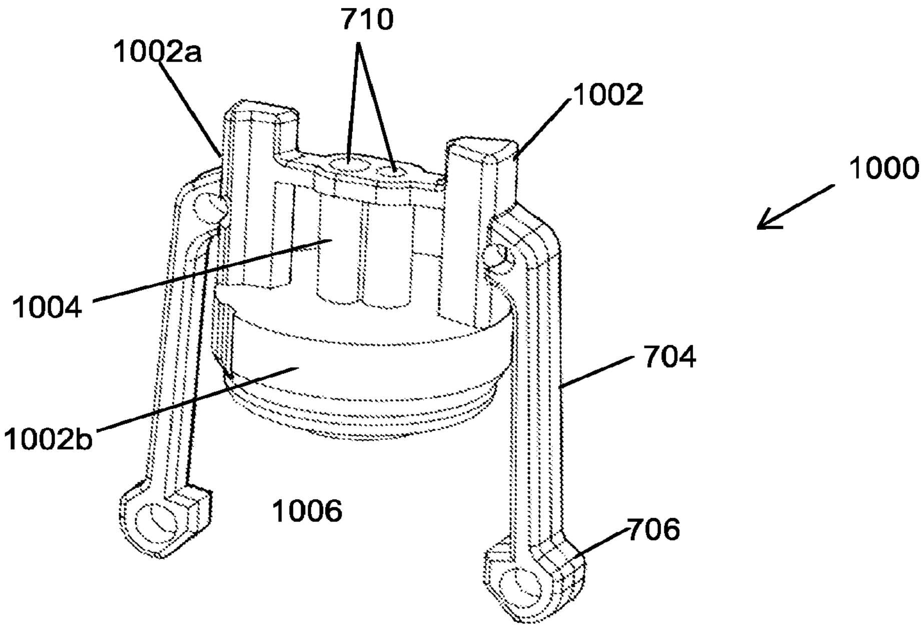
FIG. 10*a*, FIG. 10*b*, and FIG. 10*c* are respectively front, cross-sectional, and exploded views of a first embodiment of a septum holder according to the invention.
Figure 10B:
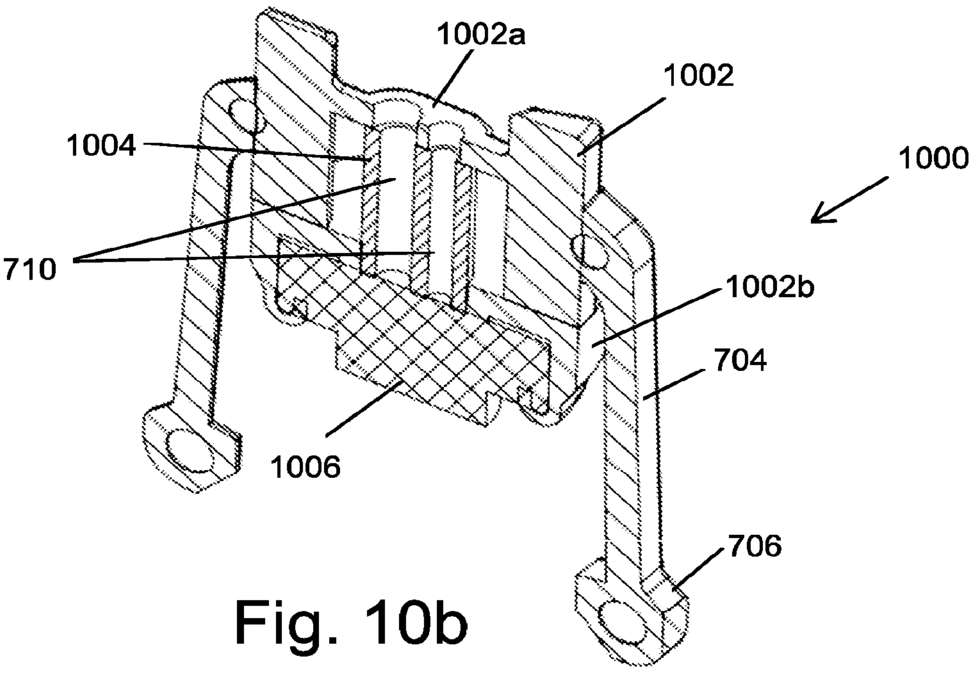
Figure 10C:
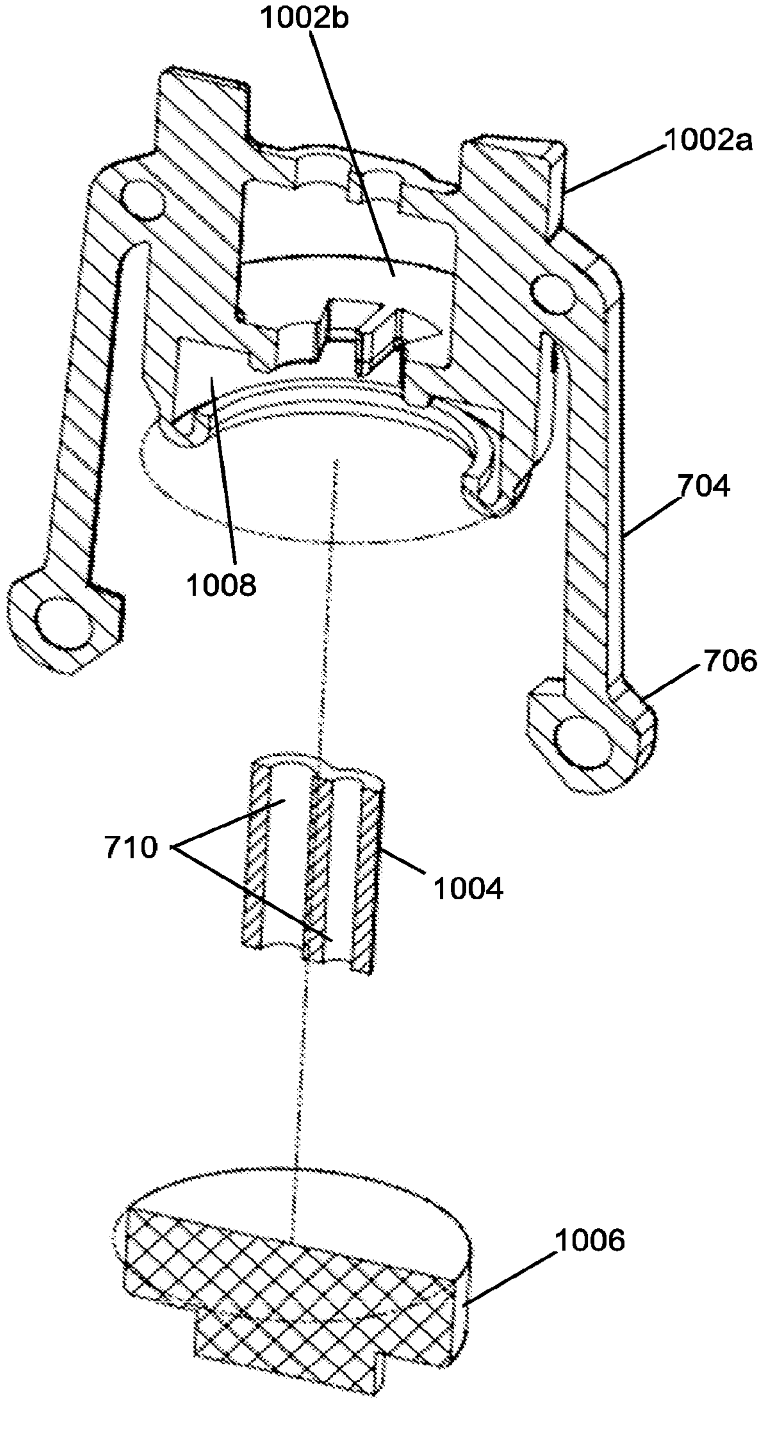

FIG. 10*a*, FIG. 10*b*, and FIG. 10*c* are respectively front, cross-sectional, and exploded views of a fourth embodiment of a septum holder 1000 according to the invention. Septum holder 1000 comprises body 1002 having a disk shaped annular lower body portion 1002*b* and an H-shaped upper body portion 1002*a*. Two equal length resilient elongated arms 704 are attached to the sides of the vertical posts of the upper body portion 1002*a*. The arms terminate with distal enlarged elements 706. A septum 1006 is attached to the bottom of body 1002 extending downward from body 1002 between arms 704.

The horizontal bar in the upper body section 1002*a* and the bottom section 1002*b* of holder body 1002 are configured to fixedly support an insert 1004 comprising two bores 710 that form the seat of a needle valve. In alternative 35 embodiments insert 1004 can have different shapes than that shown and in one embodiment can be comprised of two separate parallel pieces of tubing.

In alternative embodiments, instead of an H-shaped upper body portion 1002*a*, the upper body portion of the septum holder can comprise more than two vertical posts and more than one horizontal bar. The requirement being that the arrangement of vertical posts and horizontal bars is configured to fixedly support the upper end of insert 1004 and that, in this embodiment the insert 1004 stands exposed to the environment and is not enclosed in the septum or septum holder body like in the previous embodiments.

Septum 1006 is made of a single piece of cylindrically shaped resilient material. The upper part of septum 1006 fits into a seat 1008 created around the inside of the bottom portion 1002*b* of body 1002. Septum 1006 is held fixedly in seat 1008 by any method known in the art, e.g. press fitting, gluing, snap fitting, ultrasonic forming, and laser or ultrasonic welding. The lower part of septum 1006 has a diameter that matches that of the septum in the fluid transfer component, e.g. vial adaptor, to which it will be connected.

Figure 10D:
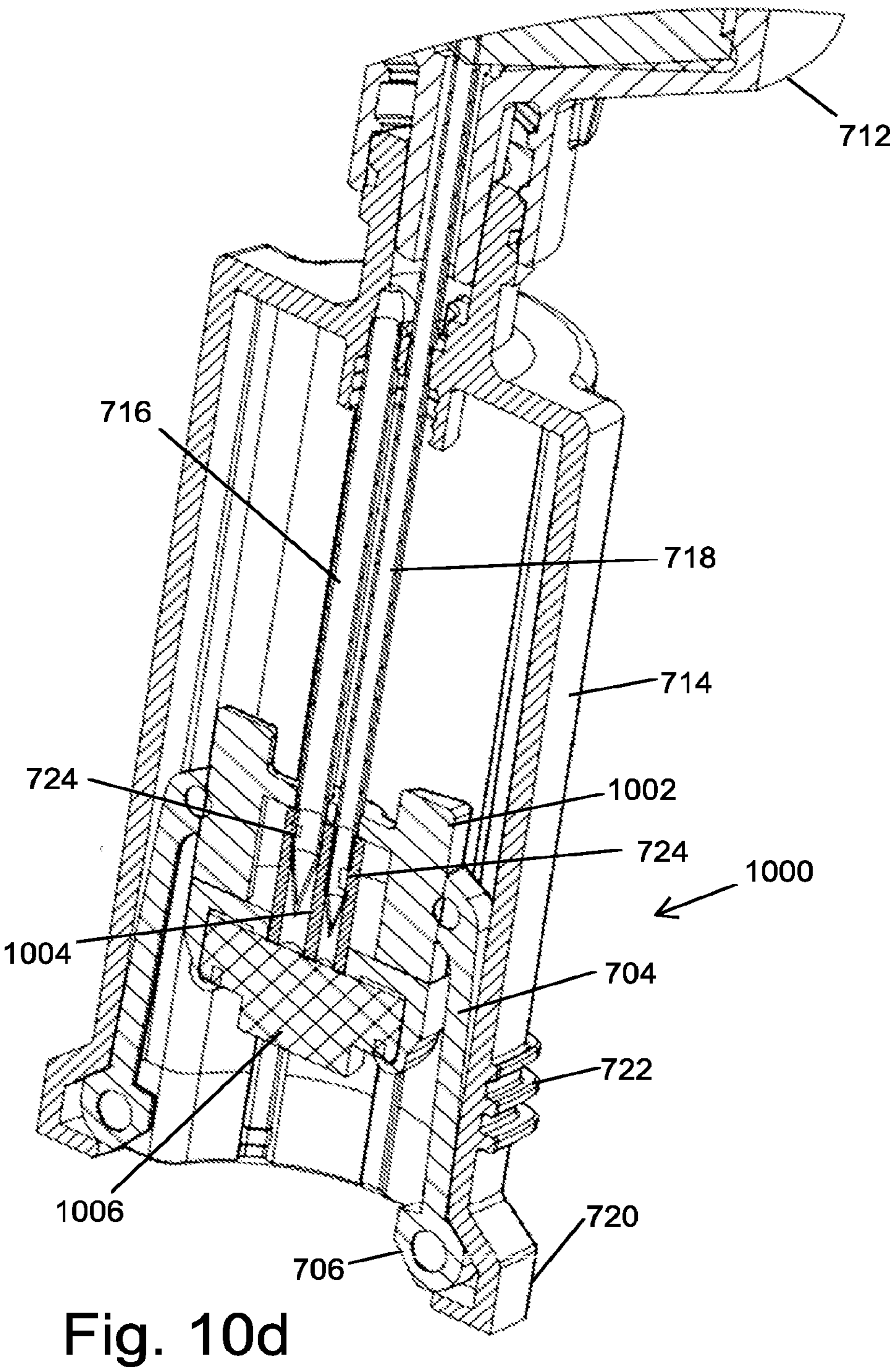
FIG. 10*d* schematically shows the holder of FIG. 10*a* in a connector section of a closed system drug transfer apparatus.

FIG. 10*d* schematically shows the holder of FIG. 10*a*, FIG. 10*b*, and FIG. 10*c* in a syringe connector section of a closed system liquid transfer apparatus. The connector section is essentially the same as that in the prior art apparatus described herein above. Cylindrical body 718 of the connector section is attached to syringe 712. Two hollow needles 714, which function as an air conduit, and 716, which functions as a liquid conduit, are fixedly attached to the upper end of body 718 of the connector section. At the lower end of the needles, adjacent to the pointed distal tips, are ports 724 that allow fluid communication between the exterior and the hollow interiors of the needles. External ridges 722 near the bottom of cylindrical body 718 serve as finger grips for use when attaching the connector section and syringe to other elements of the drug transfer system. Ridges 722 are not essential and can be eliminated or replaced with other means, for example a roughened surface area, to accomplish the same purpose.

A septum holder 1000 is located inside of cylindrical body 718 of the connector section. As shown, the distal ends of needles 716, 718 are inserted into bores 710 in insert 1004. If the insert 1004 is made of a flexible material, e.g. silicon, the diameters of bores 710 are smaller than the outer diameter of the shafts of the needles and therefore the resilient material of which the insert is manufactured pushes radially against the shaft of the needle sealing the ports 724. When not connected to another element of a liquid transfer system the distal enlarged elements 706 of arms 704 are engaged in the shoulder portion 720 at the distal end of body 718. As shown in FIG. 10*d*, in this position the tips of the needles are isolated from the outside by septum 1006 at the bottom and the walls of the bores 710 pressing radially on the shafts of the needles prevent fluids from entering or exiting the interior of the needles.

Connection of the syringe connector to a fluid transfer component, e.g. a vial adaptor, a spike adaptor for connection to an IV bag, or a connector for connection to an IV line, is accomplished in the same manner as in the prior art described herein above. When the septum of the fluid transfer component is pushed against septum 1006, septum holder 1000 begins to move upwards inside body 718 and the tips of the needles begin to exit bores 710 penetrate the solid material of septum 1006. The tips of the needles pass through septum 1006 and the septum of the fluid transfer component as holder 1000 continues to be pushed upwards, thereby establishing air and liquid channels between the element of the liquid transfer system attached to the fluid transfer component and the proximal air chamber and distal liquid chamber in the syringe.

Although embodiments of the invention have been described by way of illustration, it will be understood that the invention may be carried out with many variations, modifications, and adaptations, without exceeding the scope of the claims.

The invention claimed is:

1. A septum holder for use with a syringe connector section of a liquid transfer apparatus, said syringe connector section being connectable to another element of the liquid transfer apparatus, the septum holder comprising:

a body;

a septum attached to the body; and an insert comprising at least one bore, the at least one bore being configured to form a seat of a needle port at least prior to initiation of connection of the syringe connector section to said other element of the liquid transfer apparatus, said insert being held in place between at least a portion of the septum and at least a portion of the body.

2. The septum holder according to claim 1, wherein the body comprises an upper body part and a lower body part that projects downward from the upper body part, wherein the septum is attached at the lower body part.

3. The septum holder according to claim 1, wherein the septum comprises a septum upper part having a hollow interior forming a recess and a septum lower part configured to engage a septum in a fluid transfer component, wherein the insert is positioned at least partially within the recess.

4. The septum holder of claim 1, wherein the insert is made of one of: a resilient material and a rigid material.

5. The septum holder of claim 1, wherein the at least one bore is configured to block the needle port when the needle port is seated within the at least one bore.

6. A syringe connector section for a liquid transfer apparatus, the syringe connector section comprising: a cylindrical body adapted to be attached to syringe, the cylindrical body having a shoulder portion at its distal end; at least one hollow needle fixedly attached to an upper end of the cylindrical body of the connector section, the hollow needle having at least one port that allows fluid communication between an exterior and a hollow interior of the hollow needle at a lower end of the hollow needle adjacent to its pointed distal tip; and a septum holder according to claim 1 located inside of the cylindrical body of the syringe connector section, further comprising at least one resilient elongated arm terminating with a distal enlarged element attached to sides of the body of the septum holder; wherein, when not connected to another element of the liquid transfer apparatus, the distal enlarged element of the at least one arm of the septum holder is engaged in the shoulder portion at the distal end of the cylindrical body of the syringe connector section and the distal tip of the at least one hollow needle is inserted into the at least one bore in the insert in the body of the septum holder.

7. The syringe connector section of claim 6, wherein, when not connected to another element of the liquid transfer apparatus, sides of the at least one bore in the insert in the body of the septum holder push against a shaft of the at least one hollow needle, thereby sealing the port at the lower end of the hollow needle and preventing fluids from entering or exiting the interior of the hollow needle, and the septum of the septum holder isolates the distal tip of the at least one hollow needle from the outside.

8. The syringe connector section of claim 6, wherein the liquid transfer apparatus is a closed system, the syringe connector section comprises two needles, and the insert in the body of the septum holder comprises two bores functioning as seats of needle ports.

* * * * *